United States Patent
Liu et al.

(10) Patent No.: US 12,137,420 B2
(45) Date of Patent: Nov. 5, 2024

(54) DATA TRANSMISSION METHOD AND APPARATUS

(71) Applicant: HUAWEI TECHNOLOGIES CO., LTD., Guangdong (CN)

(72) Inventors: Xianda Liu, Beijing (CN); Liuliu Ji, Shanghai (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 604 days.

(21) Appl. No.: 17/214,347

(22) Filed: Mar. 26, 2021

(65) Prior Publication Data

US 2021/0227472 A1  Jul. 22, 2021

Related U.S. Application Data

(63) Continuation of application No. PCT/CN2019/108251, filed on Sep. 26, 2019.

(30) Foreign Application Priority Data

Sep. 27, 2018 (CN) .......................... 201811133863.0

(51) Int. Cl.
*H04W 52/14* (2009.01)
*H04L 1/00* (2006.01)
(Continued)

(52) U.S. Cl.
CPC ......... *H04W 52/146* (2013.01); *H04L 1/0003* (2013.01); *H04L 27/2082* (2013.01);
(Continued)

(58) Field of Classification Search
CPC . H04W 72/541; H04W 72/365; H04W 72/21; H04W 52/365; H04W 52/08;
(Continued)

(56) References Cited

U.S. PATENT DOCUMENTS 8,811,322 B2 *  8/2014  Feuersanger ......... H04W 72/23
                                                      370/329
9,179,424 B2 * 11/2015  Feuersaenger .......... H04L 5/001
(Continued)

FOREIGN PATENT DOCUMENTS

CN      101902750 A     12/2010
CN      105557055 A      5/2016
(Continued)

OTHER PUBLICATIONS

F. Khan, "A time-orthogonal CDMA high-speed uplink data transmission scheme for 3G and beyond," in IEEE Communications Magazine, vol. 43, No. 2, pp. 88-94, Feb. 2005, doi: 10.1109/MCOM.2005.1391506. (Year: 2005).*

(Continued)

*Primary Examiner* — William D Cumming
(74) *Attorney, Agent, or Firm* — Fish & Richardson P.C.

(57) ABSTRACT

Example data transmission methods and apparatus are described. One example method includes determining an actual transmit power for first uplink data by a terminal device based on a determined channel transmit power and a transmission parameter. The actual transmit power is less than or equal to the channel transmit power, and the transmission parameter includes one or more of parameters that can be used to indicate a location of the terminal device. The terminal device sends the first uplink data at the actual transmit power. Therefore, the terminal device may determine the actual transmit power for the uplink data based on the channel transmit power and various transmission parameters that can indicate whether the terminal device is located at a cell edge, so that the actual transmit power for the uplink data can be flexibly adjusted.

17 Claims, 6 Drawing Sheets

(51) Int. Cl.
　　　*H04L 27/20*　　　(2006.01)
　　　*H04L 27/26*　　　(2006.01)
　　　*H04W 52/36*　　　(2009.01)
　　　*H04W 72/044*　　(2023.01)
　　　*H04W 72/23*　　　(2023.01)

(52) U.S. Cl.
　　　CPC ....... *H04L 27/2636* (2013.01); *H04W 52/365* (2013.01); *H04W 52/367* (2013.01); *H04W 72/0473* (2013.01); *H04W 72/23* (2023.01)

(58) Field of Classification Search
　　　CPC ............... H04W 52/146; H04W 72/23; H04W 72/1268; H04W 72/0446
　　　USPC ........................................ 370/320, 329, 310
　　　See application file for complete search history.

(56) References Cited

U.S. PATENT DOCUMENTS

| | | | | |
|---|---|---|---|---|
| 9,532,320 | B2* | 12/2016 | Feuersaenger | H04L 5/0037 |
| 11,026,251 | B2* | 6/2021 | Yoshimoto | H04W 72/21 |
| 11,445,540 | B2* | 9/2022 | Goto | H04W 72/1263 |
| 2008/0151794 | A1* | 6/2008 | Moilanen | H04W 72/541 |
| | | | | 370/310 |
| 2012/0224552 | A1* | 9/2012 | Feuersanger | H04W 72/23 |
| | | | | 370/329 |
| 2013/0337862 | A1 | 12/2013 | Liu et al. | |
| 2014/0307681 | A1* | 10/2014 | Feuersaenger | H04L 5/0053 |
| | | | | 370/329 |
| 2016/0021624 | A1* | 1/2016 | Feuersaenger | H04L 5/006 |
| | | | | 370/329 |
| 2021/0076409 | A1* | 3/2021 | Goto | H04W 72/1268 |
| 2021/0144715 | A1* | 5/2021 | Gotoh | H04L 1/0004 |
| 2021/0160917 | A1* | 5/2021 | Goto | H04W 72/0446 |
| 2021/0227472 | A1* | 7/2021 | Liu | H04W 52/08 |
| 2021/0243784 | A1* | 8/2021 | Goto | H04W 72/21 |
| 2023/0276379 | A1* | 8/2023 | Nilsson | H04W 52/42 |
| | | | | 455/522 |

FOREIGN PATENT DOCUMENTS

| | | | | |
|---|---|---|---|---|
| CN | 105580452 | A | | 5/2016 |
| CN | 107615814 | A | | 1/2018 |
| CN | 104508990 | B | | 3/2018 |
| CN | 104272820 | B | | 4/2018 |
| CN | 110324784 | A * | 10/2019 | ............ A43C 11/16 |
| EP | 3313129 | A1 | | 4/2018 |
| EP | 3852464 | A4 * | 11/2021 | ........... H04B 7/0456 |
| JP | 2016525854 | A | | 8/2016 |
| JP | 2017017482 | A | | 1/2017 |
| JP | 2017108459 | A | | 6/2017 |
| WO | 2010150552 | A1 | | 12/2010 |
| WO | 2017024464 | A1 | | 2/2017 |
| WO | WO-2018024227 | A1 * | 2/2018 | .......... H04W 52/146 |
| WO | WO-2019161542 | A1 * | 8/2019 | .......... H04L 5/0092 |

OTHER PUBLICATIONS

Office Action in Japanese Appln. No. 2021-517573, dated Oct. 4, 2022, 9 pages (with English translation).
Office Action issued in Indian Application No. 202127015763 dated Feb. 4, 2022, 5 pages.
Intel Corporation, "Remaining Issues on PT-RS," 3GPP TSG RAN WG1 Meeting #93, R1-1806512, Busan, Korea, May 21-25, 2018, 3 pages.
3GPP TS 38.213 V15.2.0 (Jun. 2018), "3rd Generation Partnership Project; Technical Specification Group Radio Access Network; NR; Physical layer procedures for control (Release 15)," Jun. 2018, 99 pages.
3GPP TS 38.211 V15.2.0 (Jun. 2018), "3rd Generation Partnership Project; Technical Specification Group Radio Access Network; NR; Physical channels and modulation (Release 15)," Jun. 2018, 96 pages.
3GPP TS 38.212 V15.2.0 (Jun. 2018), "3rd Generation Partnership Project; Technical Specification Group Radio Access Network; NR; Multiplexing and channel coding (Release 15)," Jun. 2018, 98 pages.
3GPP TS 38.214 V15.2.0 (Jun. 2018), "3rd Generation Partnership Project; Technical Specification Group Radio Access Network; NR; Physical layer procedures for data (Release 15)," Jun. 2018, 94 pages.
PCT International Search Report and Written Opinion in International Application No. PCT/CN2019/108251, dated Dec. 27, 2019, 19 pages.
3GPP TS 38.213 V15.1.0 (Mar. 2018), 3rd Generation Partnership Project; Technical Specification Group Radio Access Network;NR;Physical layer procedures for control(Release 15), Mar. 2018, 77 pages.
CATT, "Discussion on remaining details of codebook based UL transmission," 3GPP TSG RAN WG1 Meeting 91, R1-1720178, Reno, USA, Nov. 27-Dec. 1, 2017, 14 pages.
Ericsson, "PUSCH power scaling in UL power control," 3GPP TSG RAN WG1 Meeting #93, R1-1807267, Busan, Korea, May 21-25, 2018, 9 pages.
Ericsson, "SRS power scaling in UL power control," 3GPP TSG-RAN WG1 Meeting #94, R1-1809412, Göteborg, Sweden, Aug. 20-24, 2018, 15 pages.
Extended European Search Report issued in European Application No. 19865564.9 dated Sep. 30, 2021, 12 pages.
Samsung, "Issues on codebook based UL transmission," 3GPP TSG RAN WG1 Meeting #93, R1-1806709, Busan, Korea, May 21-25, 2018, 5 pages.

* cited by examiner

DATA TRANSMISSION METHOD AND APPARATUS

CROSS-REFERENCE TO RELATED APPLICATION

This application is a continuation of International Application No. PCT/CN2019/108251, filed on Sep. 26, 2019, which claims priority to Chinese Patent Application No. 201811133863.0, filed on Sep. 27, 2018, The disclosures of the aforementioned applications are hereby incorporated by reference in their entireties.

TECHNICAL FIELD

This application relates to the communications field, and more specifically, to a data transmission method and apparatus in the communications field.

BACKGROUND

During uplink transmission, an actual transmit power used by a terminal device to send uplink data is $p_t=(N/M) \times p_p$, where $p_t$ is the actual transmit power used by the terminal device to send the uplink data, $p_p$ is a channel transmit power used by the terminal device to send the uplink data, N is a quantity of non-zero power antenna ports used to send the uplink data, and M is a quantity of antenna ports configured by a network device or predefined to send the uplink data.

It can be learned from the foregoing formula $p_t=(N/M) \times p_p$, that a smaller value of N indicates a lower actual transmit power for the uplink data. When N is less than M, the actual transmit power is always less than the channel transmit power. Actually, if the actual transmit power is always less than the channel transmit power, data transmission reliability is affected in some cases. For example, a terminal device located at a cell edge usually performs uplink transmission at one transport layer, to improve transmission robustness. However, in an existing power control mechanism, when there is one transport layer, N is less than M, and it means that an actual transmit power is less than a channel transmit power. A relatively low transmit power affects demodulation performance of uplink data sent by the terminal device located at the cell edge. Consequently, data transmission reliability is affected.

Therefore, a technology needs to be provided to improve data transmission reliability.

SUMMARY

This application provides a data transmission method and apparatus, to effectively improve data transmission reliability.

According to a first aspect, a data transmission method is provided. The method includes:

A terminal device determines a channel transmit power for first uplink data.

The terminal device determines an actual transmit power for the first uplink data based on the channel transmit power and a transmission parameter, where the actual transmit power is less than or equal to the channel transmit power, and the transmission parameter includes one or more of the following:

a power headroom, where the power headroom indicates a difference between a maximum transmit power allowed by the terminal device and the channel transmit power, and the channel transmit power is less than or equal to the maximum transmit power allowed by the terminal device; or a waveform used to send the first uplink data; or a downlink control information DCI format used to schedule the first uplink data; or a modulation and coding scheme MCS used to send the first uplink data; or a power adjustment value used to send the first uplink data.

The terminal device sends the first uplink data at the actual transmit power.

Therefore, according to the data transmission method provided in this embodiment of this application, the actual transmit power for the uplink data is determined based on the channel transmit power and various transmission parameters that can indicate whether the terminal device is located at a cell edge, so that the actual transmit power for the uplink data can be flexibly adjusted, thereby improving data transmission reliability.

In a possible implementation, N is less than M, M is a quantity of antenna ports configured by a network device to send the first uplink data, N is a quantity of non-zero power antenna ports that are in the M antenna ports and that are used to send the first uplink data, N is an integer greater than or equal to 1, and M is an integer greater than 1.

Therefore, according to the data transmission method provided in this embodiment of this application, when N is less than M, the actual transmit power for the uplink data is determined based on the channel transmit power and various transmission parameters that can indicate whether the terminal device is located at a cell edge, so that the actual transmit power for the uplink data can be adjusted more effectively and flexibly, thereby improving data transmission reliability.

In a possible implementation, the transmission parameter includes the power headroom.

If the power headroom satisfies a first condition, the actual transmit power is $p_t > (N/M) \times p_p$, where $p_p$ is the channel transmit power.

The first condition is used to determine that the terminal device is located at the cell edge.

Therefore, according to the data transmission method provided in this embodiment of this application, when the power headroom that can indicate a location of the terminal device satisfies the first condition, the actual transmit power is increased, so that the terminal device located at the cell edge can send the uplink data at a relatively high transmit power, thereby improving data transmission reliability.

In a possible implementation, if the power headroom does not satisfy a first condition, the actual transmit power is $p_t=(N/M) \times p_p$.

Therefore, according to the data transmission method provided in this embodiment of this application, when the power headroom that can indicate a location of the terminal device does not satisfy the first condition, the uplink data is sent at a scaled channel transmit power. For the terminal device located at a non-cell edge, this helps reduce interference caused by data transmission, and also helps reduce power consumption of the terminal device.

In a possible implementation, the first condition is that the power headroom is greater than or equal to a first threshold.

When N=1 and M=4, the first threshold is equal to 6 dBm; or when N=2 and M=4, the first threshold is equal to 3 dBm; or when N=1 and M=2, the first threshold is equal to 3 dBm.

In other words, if the power headroom is greater than or equal to 6 dBm, the actual transmit power is $p_t>(N/M)\times p_p$; or if the power headroom is less than 6 dBm, the actual transmit power is $p_t=(N/M)\times p_p$.

In another possible implementation, the first condition is that the power headroom is greater than or equal to a first threshold.

When N=1 and M=4, the first threshold is equal to 6 dBm; or when N=2 and M=4, the first threshold is equal to 3 dBm; or when N=1 and M=2, the first threshold is equal to 3 dBm.

In a possible implementation, the transmission parameter includes the waveform used to send the first uplink data.

If the waveform is a discrete Fourier transform spread orthogonal frequency division multiplexing DFT-s-OFDM waveform, the actual transmit power is $p_t>(N/M)\times p_p$, where $p_p$ is the channel transmit power.

According to the data transmission method provided in this embodiment of this application, when the waveform that can indicate the location of the terminal device is the DFT-s-OFDM waveform, the actual transmit power is increased, so that the terminal device located at the cell edge can send the uplink data at a relatively high actual transmit power, thereby improving data transmission reliability.

In a possible implementation, if the waveform is a cyclic prefix orthogonal frequency division multiplexing (cyclic prefix orthogonal frequency division multiplexing, CP-OFDM) waveform, the actual transmit power is $p_t=(N/M)\times p_p$.

Therefore, when the waveform that can indicate the location of the terminal device is the CP-OFDM waveform, the uplink data is sent at a scaled channel transmit power. For the terminal device located at the non-cell edge, this helps reduce interference caused by data transmission, and also helps reduce power consumption of the terminal device.

In a possible implementation, the transmission parameter includes the downlink control information DCI format used to send the first uplink data.

If the DCI format is a first DCI format, the actual transmit power is $p_t>(N/M)\times p_p$, where the first DCI format is a DCI format including a smallest quantity of bits in a plurality of DCI formats used to schedule the uplink data, and $p_p$ is the channel transmit power.

According to the data transmission method provided in this embodiment of this application, when the DCI format that can indicate the location of the terminal device is the DCI format including the smallest quantity of bits in the plurality of DCI formats used to schedule the uplink data, the actual transmit power is increased, so that the terminal device located at the cell edge can send the uplink data at a relatively high actual transmit power, thereby improving data transmission reliability.

In a possible implementation, if the DCI format is a second DCI format, the actual transmit power is $p_t=(N/M)\times p_p$, where the second DCI format is a DCI format other than the first DCI format in a plurality of DCI formats used to schedule the uplink data.

Therefore, when the DCI format that can indicate the location of the terminal device is the second DCI format, the uplink data is sent at a scaled channel transmit power. For the terminal device located at the non-cell edge, this helps reduce interference caused by data transmission, and also helps reduce power consumption of the terminal device.

In a possible implementation, the transmission parameter includes the modulation and coding scheme MCS used to send the first uplink data.

If a modulation scheme of the MCS is binary phase shift keying BPSK or quadrature phase shift keying QPSK, the actual transmit power is $p_t>(N/M)\times p_p$, where $p_p$ is the channel transmit power.

According to the data transmission method provided in this embodiment of this application, when the modulation scheme of the MCS that can indicate the location of the terminal device is BPSK or QPSK, the actual transmit power is increased, so that the terminal device located at the cell edge can send the uplink data at a relatively high actual transmit power, thereby improving data transmission reliability.

In a possible implementation, if a modulation scheme of the MCS is 16 quadrature amplitude modulation QAM, 64QAM, or a higher-order modulation scheme, the actual transmit power is $p_t=(N/M)\times p_p$.

Therefore, when the modulation scheme of the MCS that can indicate the location of the terminal device is 16 quadrature amplitude modulation QAM, 64QAM, or the higher-order modulation scheme, the uplink data is sent at a scaled channel transmit power. For the terminal device located at the non-cell edge, this helps reduce interference caused by data transmission, and also helps reduce power consumption of the terminal device.

In a possible implementation, the transmission parameter includes the power adjustment value used to send the first uplink data.

If power adjustment values obtained by the terminal device for K times each satisfy a second condition, the actual transmit power is $p_t>(N/M)\times p_p$, where $p_p$ is the channel transmit power, and K is an integer greater than or equal to 1.

The second condition is used to determine that the terminal device is located at the cell edge.

According to the data transmission method provided in this embodiment of this application, when power adjustment values that are obtained by the terminal device for a plurality of times and that can indicate the location of the terminal device each satisfy the second condition, the actual transmit power is increased, so that the terminal device located at the cell edge can send the uplink data at a relatively high actual transmit power, thereby improving data transmission reliability.

In a possible implementation, if power adjustment values obtained by the terminal device for K times each do not satisfy a second condition, the actual transmit power is $p_t=(N/M)\times p_p$.

In a possible implementation, the second condition is that the power adjustment values obtained by the terminal device for K times each are greater than or equal to a second threshold, and the second threshold is equal to 3 dB or 3 dBm.

In a possible implementation, the second condition is specifically that power adjustment values obtained by the terminal device for K consecutive times each are equal to the second threshold, the second threshold is equal to 3 dB or 3 dBm, and K is an integer greater than 1.

In a possible implementation, if at least one of the power adjustment values obtained by the terminal device for K times is less than 3 dB or 3 dBm, the actual transmit power is $p_t=(N/M)\times p_p$.

Therefore, when power adjustment values that are obtained by the terminal device for a plurality of times and that can indicate the location of the terminal device each do not satisfy the second condition, the uplink data is sent at a scaled channel transmit power. For the terminal device located at the non-cell edge, this helps reduce interference caused by data transmission, and also helps reduce power consumption of the terminal device.

In a possible implementation, the actual transmit power is equal to the channel transmit power.

Therefore, by enabling the actual transmit power to be equal to the channel transmit power, data transmission reliability can be improved to a maximum extent.

In a possible implementation, when N=1, a transmit power on the one antenna port is $p_0=p_p$; or when N=2, a transmit power on one of the two antenna ports is $p_0=0.5p_p$.

In a possible implementation, the method further includes:

The terminal device evenly allocates the actual transmit power to the N antenna ports used to send the first uplink data.

According to a second aspect, a data transmission method is provided. The method includes:

A terminal device determines a channel transmit power for first uplink data.

The terminal device determines an actual transmit power for the first uplink data based on the channel transmit power and a transmission parameter, where the actual transmit power is less than or equal to the channel transmit power, and the transmission parameter includes one or more of the following:

a power headroom, where the power headroom indicates a difference between a maximum transmit power allowed by the terminal device and the channel transmit power, and the channel transmit power is less than or equal to the maximum transmit power allowed by the terminal device; or
a waveform used to send the first uplink data; or
a downlink control information DCI format used to schedule the first uplink data; or
a modulation and coding scheme MCS used to send the first uplink data; or
a power adjustment value used to send the first uplink data.

The terminal device sends the first uplink data at the actual transmit power.

Therefore, according to the data transmission method provided in this embodiment of this application, the actual transmit power for the uplink data is determined based on the channel transmit power and various transmission parameters that can indicate whether the terminal device is located at a cell edge, so that the actual transmit power for the uplink data can be flexibly adjusted, thereby improving data transmission reliability.

In a possible implementation, N is less than M, M is a quantity of antenna ports configured by a network device to send the first uplink data, N is a quantity of non-zero power antenna ports that are in the M antenna ports and that are used to send the first uplink data, N is an integer greater than or equal to 1, and M is an integer greater than 1.

In a possible implementation, the transmission parameter includes the power headroom.

That the terminal device determines an actual transmit power for the first uplink data based on the channel transmit power and a transmission parameter includes:

The terminal device determines that the power headroom satisfies a first condition.

The terminal device determines the actual transmit power for the first uplink data.

In a possible implementation, the first condition is that the power headroom is greater than or equal to a first threshold.

The first threshold satisfies at least one of the following:

When N=1 and M=4, the first threshold is equal to 6 dBm; or
when N=2 and M=4, the first threshold is equal to 3 dBm; or
when N=1 and M=2, the first threshold is equal to 3 dBm.

In a possible implementation, the transmission parameter includes the waveform used to send the first uplink data.

That the terminal device determines an actual transmit power for the first uplink data based on the channel transmit power and a transmission parameter includes:

The terminal device determines that the waveform is a discrete Fourier transform spread orthogonal frequency division multiplexing DFT-s-OFDM waveform.

The terminal device determines the actual transmit power for the first uplink data.

In a possible implementation, the transmission parameter includes the downlink control information DCI format used to send the first uplink data.

That the terminal device determines an actual transmit power for the first uplink data based on the channel transmit power and a transmission parameter includes:

The terminal device determines that the DCI format is a first DCI format, where the first DCI format is a DCI format including a smallest quantity of bits in a plurality of DCI formats used to schedule the uplink data.

The terminal device determines the actual transmit power for the first uplink data.

In a possible implementation, the transmission parameter includes the modulation and coding scheme MCS used to send the first uplink data.

That the terminal device determines an actual transmit power for the first uplink data based on the channel transmit power and a transmission parameter includes:

The terminal device determines that a modulation scheme of the MCS is binary phase shift keying BPSK or quadrature phase shift keying QPSK.

The terminal device determines the actual transmit power for the first uplink data.

In a possible implementation, the transmission parameter includes the power adjustment value used to send the first uplink data.

That the terminal device determines an actual transmit power for the first uplink data based on the channel transmit power and a transmission parameter includes:

The terminal device determines that power adjustment values obtained by the terminal device for K times each satisfy a second condition, where K is an integer greater than or equal to 1.

The terminal device determines the actual transmit power for the first uplink data.

In a possible implementation, the second condition is that the power adjustment values obtained by the terminal device for K times each are greater than or equal to a second threshold, and the second threshold is equal to 3 dBm.

In a possible implementation, the second condition is specifically that power adjustment values obtained by the terminal device for K consecutive times each are equal to the second threshold, and K is an integer greater than 1.

In a possible implementation, the actual transmit power is $p_t \geq (N/M) \times p_p$, where $p_p$ is the channel transmit power.

In a possible implementation, the actual transmit power is equal to the channel transmit power.

In a possible implementation, when N=1, a transmit power on the one antenna port is $p_0=p_p$; or
when N=2, a transmit power on one of the two antenna ports is $p_0=0.5p_p$.

In a possible implementation, the method further includes:

The terminal device evenly allocates the actual transmit power to the N antenna ports used to send the first uplink data.

According to a third aspect, an information transmission method is provided. The method includes:

A terminal device receives indication information, where the indication information is used to indicate a first precoding matrix used to send first uplink data, and the first precoding matrix belongs to a first precoding matrix subset or a second precoding matrix subset of a precoding matrix set.

A transmit power for uplink data that is determined based on each of one or more precoding matrices in the first precoding matrix subset satisfies the following condition: a transmit power on one of antenna ports used to send the uplink data is $p_0 > (1/M) \times p_p$, where a quantity of antenna ports used to send the uplink data is greater than or equal to 1 and less than M; and a transmit power for uplink data that is determined based on each of one or more precoding matrices in the second precoding matrix subset satisfies the following condition: a transmit power on one of the antenna ports used to send the uplink data is $p_0 = (1/M) \times p_p$.

Herein, M is a quantity of antenna ports configured by a network device to send the first uplink data, M is an integer greater than 1, and $p_p$ is a channel transmit power for the uplink data.

The terminal device determines an actual transmit power for the first uplink data based on the first precoding matrix and the channel transmit power for the first uplink data, where the actual transmit power is less than or equal to the channel transmit power for the first uplink data.

The terminal device sends the first uplink data at the actual transmit power.

Therefore, according to the data transmission method in this embodiment of this application, the first precoding matrix subset and the second precoding subset are set in the precoding set; a transmit power for uplink data that is determined based on any precoding matrix in the first precoding matrix subset satisfies the following condition: a transmit power on one of the antenna ports used to send the uplink data is $p_0 > (1/M) \times p_p$, where the quantity of antenna ports used to send the uplink data is greater than or equal to 1 and less than M; and a transmit power for uplink data that is determined based on any precoding matrix in the second precoding matrix subset satisfies the following condition: a transmit power on one of the antenna ports used to send the uplink data is $p_0 = (1/M) \times p_p$. Therefore, the network device can dynamically indicate, from the two precoding matrix subsets, a precoding matrix to be send the to-be-sent uplink data, in other words, can flexibly determine the actual transmit power for the to-be-sent uplink data, thereby improving data transmission reliability.

In a possible implementation, the transmit power determined based on each of the one or more precoding matrices in the first precoding matrix subset specifically satisfies the following condition:

When the quantity of antenna ports used to send the uplink data is equal to 1, a transmit power on the one antenna port is $p_0 = p_p$; or when the quantity of antenna ports used to send the uplink data is equal to 2, a transmit power on one of the two antenna ports is $p_0 = 0.5 p_p$.

In other words, the actual transmit power determined based on each of the one or more precoding matrices in the first precoding matrix subset is equal to the channel transmit power.

Therefore, by enabling the actual transmit power to be equal to the channel transmit power, data transmission reliability can be improved to a maximum extent.

In a possible implementation, each precoding matrix in the precoding matrix set includes a phase and an amplitude quantized value, and the amplitude quantized value is used to determine the transmit power for the uplink data.

A phase of each of the one or more precoding matrices in the first precoding matrix subset is a phase of a precoding matrix included in the second precoding matrix subset.

A precoding matrix is indicated by using a bit field index value. Therefore, during implementation, a quantity of occupied bits is determined based on a quantity of precoding matrices included in the precoding matrix set. For example, if the quantity of bits is N, the N bits may indicate $2^n$ precoding matrices. However, actually, there may be some remaining bit values. Because the phase of the precoding matrix in the first precoding matrix subset is the phase of the precoding matrix in the second precoding subset, it means that the first precoding subset includes fewer precoding matrices. Therefore, the precoding matrix in the first precoding subset may be indicated by using a remaining bit value in the precoding matrix set, so that a precoding matrix with an adjusted amplitude quantized value can be indicated by using a reserved field, without changing a quantity of existing bits and without affecting flexibility of selecting an existing codeword.

In a possible implementation, each precoding matrix in the precoding matrix set includes a phase and an amplitude quantized value, the amplitude quantized value is used to determine the transmit power for the uplink data, and each precoding matrix in the first precoding matrix subset satisfies the following condition:

When the quantity of antenna ports used to send the uplink data is equal to 1, an amplitude quantized value of each precoding matrix in the first precoding matrix subset is 1; or when the quantity of antenna ports used to send the uplink data is equal to 2, an amplitude quantized value of each precoding matrix in the first precoding matrix subset is.

$$1/\sqrt{2}.$$

In a possible implementation, precoding matrices in the precoding matrix set are precoding matrices that are used to send the uplink data and that correspond to a quantity of transport layers less than or equal to L transport layers, one transport layer corresponds to one or more precoding matrices, L is a largest quantity of transport layers that can be supported by the terminal device, L is an integer greater than or equal to 1, and a precoding matrix in the first precoding matrix subset corresponds to one transport layer.

According to a fourth aspect, a data transmission method is provided. The method includes:

A network device determines a channel transmit power for first uplink data.

The network device determines an actual transmit power for the first uplink data based on the channel transmit power and a transmission parameter, where the actual transmit power is less than or equal to the channel transmit power, and the transmission parameter includes one or more of the following:

a power headroom, where the power headroom indicates a difference between a maximum transmit power allowed by the terminal device and the channel transmit power, and the channel transmit power is less than or equal to the maximum transmit power allowed by the terminal device; or a waveform used to send the first uplink data; or a downlink control information DCI format used to schedule the first uplink data; or a modulation and coding scheme MCS used to send the first uplink data; or a power adjustment value used to send the first uplink data.

The network device receives the first uplink data.

Therefore, according to the data transmission method provided in this embodiment of this application, the actual transmit power for the uplink data is determined based on the channel transmit power and various transmission parameters that can indicate whether the terminal device is located at a cell edge, so that the actual transmit power for the uplink data can be flexibly adjusted, thereby improving data transmission reliability. In addition, this facilitates scheduling by the network device and system optimization.

In a possible implementation, N is less than M, M is a quantity of antenna ports configured by the network device to send the first uplink data, N is a quantity of non-zero power antenna ports that are in the M antenna ports and that are used to send the first uplink data, N is an integer greater than or equal to 1, and M is an integer greater than 1.

Therefore, according to the data transmission method provided in this embodiment of this application, when N is less than M, the actual transmit power for the uplink data is determined based on the channel transmit power and various transmission parameters that can indicate whether the terminal device is located at a cell edge, so that the actual transmit power for the uplink data can be adjusted more effectively and flexibly, thereby improving data transmission reliability. In addition, this facilitates scheduling by the network device and system optimization.

In a possible implementation, the transmission parameter includes the power headroom.

If the power headroom satisfies a first condition, the actual transmit power is $p_t > (N/M) \times p_p$, where $p_p$ is the channel transmit power.

The first condition is used to determine that the terminal device is located at the cell edge.

Therefore, according to the data transmission method provided in this embodiment of this application, when the power headroom that can indicate a location of the terminal device satisfies the first condition, the actual transmit power is increased, so that the terminal device located at the cell edge can send the uplink data at a relatively high transmit power, thereby improving data transmission reliability.

In a possible implementation, if the power headroom does not satisfy a first condition, the actual transmit power is $p_t = (N/M) \times p_p$.

In a possible implementation, the first condition is that the power headroom is greater than or equal to a first threshold.

When N=1 and M=4, the first threshold is equal to 6 dBm; or when N=2 and M=4, the first threshold is equal to 3 dBm; or when N=1 and M=2, the first threshold is equal to 3 dBm.

In a possible implementation, the transmission parameter includes the waveform used to send the first uplink data.

If the waveform is a discrete Fourier transform spread orthogonal frequency division multiplexing DFT-s-OFDM waveform, the actual transmit power is $p_t > (N/M) \times p_p$ where $p_p$ is the channel transmit power.

According to the data transmission method provided in this embodiment of this application, when the waveform that can indicate the location of the terminal device is the DFT-s-OFDM waveform, the actual transmit power is increased, so that the terminal device located at the cell edge can send the uplink data at a relatively high actual transmit power, thereby improving data transmission reliability. In addition, this facilitates scheduling by the network device and system optimization.

In a possible implementation, if the waveform is a CP-OFDM waveform, the actual transmit power is $p_t = (N/M) \times p_p$.

In a possible implementation, the transmission parameter includes the downlink control information DCI format used to send the first uplink data.

If the DCI format is a first DCI format, the actual transmit power is $p_t > (N/M) \times p_p$, where the first DCI format is a DCI format including a smallest quantity of bits in a plurality of DCI formats used to schedule the uplink data, and $p_p$ is the channel transmit power.

According to the data transmission method provided in this embodiment of this application, when the DCI format that can indicate the location of the terminal device is the DCI format including the smallest quantity of bits in the plurality of DCI formats used to schedule the uplink data, the actual transmit power is increased, so that the terminal device located at the cell edge can send the uplink data at a relatively high actual transmit power, thereby improving data transmission reliability. In addition, this facilitates scheduling by the network device and system optimization.

In a possible implementation, if the DCI format is a second DCI format, the actual transmit power is $p_t = (N/M) \times p_p$, where the second DCI format is a DCI format other than the first DCI format in a plurality of DCI formats used to schedule the uplink data.

In a possible implementation, the transmission parameter includes the modulation and coding scheme MCS used to send the first uplink data.

If a modulation scheme of the MCS is binary phase shift keying BPSK or quadrature phase shift keying QPSK, the actual transmit power is $p_t > (N/M) \times p_p$, where $p_p$ is the channel transmit power.

According to the data transmission method provided in this embodiment of this application, when the modulation scheme of the MCS that can indicate the location of the terminal device is BPSK or QPSK, the actual transmit power is increased, so that the terminal device located at the cell edge can send the uplink data at a relatively high actual transmit power, thereby improving data transmission reliability. In addition, this facilitates scheduling by the network device and system optimization.

In a possible implementation, if a modulation scheme of the MCS is 16 quadrature amplitude modulation QAM, the actual transmit power is $p_t = (N/M) \times p_p$.

In a possible implementation, the transmission parameter includes the power adjustment value used to send the first uplink data.

If power adjustment values obtained by the terminal device for K times each satisfy a second condition, the actual transmit power is $p_t > (N/M) \times p_p$, where $p_p$ is the channel transmit power, and K is an integer greater than or equal to 1.

The second condition is used to determine that the terminal device is located at the cell edge.

According to the data transmission method provided in this embodiment of this application, when power adjustment values that are obtained by the terminal device for a plurality of times and that can indicate the location of the terminal device each satisfy the second condition, the actual transmit power is increased, so that the terminal device located at the cell edge can send the uplink data at a relatively high actual transmit power, thereby improving data transmission reliability. In addition, this facilitates scheduling by the network device and system optimization.

In a possible implementation, if power adjustment values obtained by the terminal device for K times each do not satisfy a second condition, the actual transmit power is $p_t = (N/M) \times p_p$.

In a possible implementation, the second condition is that the power adjustment values obtained by the terminal device for K times each are greater than or equal to a second threshold, and the second threshold is equal to 3 dBm.

In a possible implementation, the second condition is specifically that power adjustment values obtained by the terminal device for K consecutive times each are equal to the second threshold, and K is an integer greater than 1.

In a possible implementation, the actual transmit power is equal to the channel transmit power.

Therefore, by enabling the actual transmit power to be equal to the channel transmit power, data transmission reliability can be improved to a maximum extent.

In a possible implementation, when N=1, a transmit power on the one antenna port is $p_0 = p_p$; or when N=2, a transmit power on one of the two antenna ports is $p_0 = 0.5 p_p$.

According to a fifth aspect, a data transmission method is provided. The method includes:

A network device determines a channel transmit power for first uplink data.

The network device determines an actual transmit power for the first uplink data based on the channel transmit power and a transmission parameter, where the actual transmit power is less than or equal to the channel transmit power, and the transmission parameter includes one or more of the following:
  a power headroom, where the power headroom indicates a difference between a maximum transmit power allowed by the terminal device and the channel transmit power, and the channel transmit power is less than or equal to the maximum transmit power allowed by the terminal device; or
  a waveform used to send the first uplink data; or
  a downlink control information DCI format used to schedule the first uplink data; or
  a modulation and coding scheme MCS used to send the first uplink data; or
  a power adjustment value used to send the first uplink data.

The terminal device sends the first uplink data at the actual transmit power.

Therefore, according to the data transmission method provided in this embodiment of this application, the actual transmit power for the uplink data is determined based on the channel transmit power and various transmission parameters that can indicate whether the terminal device is located at a cell edge, so that the actual transmit power for the uplink data can be flexibly adjusted, thereby improving data transmission reliability.

In a possible implementation, N is less than M, M is a quantity of antenna ports configured by the network device to send the first uplink data, N is a quantity of non-zero power antenna ports that are in the M antenna ports and that are used to send the first uplink data, N is an integer greater than or equal to 1, and M is an integer greater than 1.

In a possible implementation, the transmission parameter includes the power headroom.

That the network device determines an actual transmit power for the first uplink data based on the channel transmit power and a transmission parameter includes:

The network device determines that the power headroom satisfies a first condition.

The network device determines the actual transmit power for the first uplink data.

In a possible implementation, the first condition is that the power headroom is greater than or equal to a first threshold.

The first threshold satisfies at least one of the following:
  When N=1 and M=4, the first threshold is equal to 6 dBm; or
  when N=2 and M=4, the first threshold is equal to 3 dBm; or
  when N=1 and M=2, the first threshold is equal to 3 dBm.

In a possible implementation, the transmission parameter includes the waveform used to send the first uplink data.

That the network device determines an actual transmit power for the first uplink data based on the channel transmit power and a transmission parameter includes:

The network device determines that the waveform is a discrete Fourier transform spread orthogonal frequency division multiplexing DFT-s-OFDM waveform.

The network device determines the actual transmit power for the first uplink data.

In a possible implementation, the transmission parameter includes the downlink control information DCI format used to send the first uplink data.

That the network device determines an actual transmit power for the first uplink data based on the channel transmit power and a transmission parameter includes:

The network device determines that the DCI format is a first DCI format, where the first DCI format is a DCI format including a smallest quantity of bits in a plurality of DCI formats used to schedule the uplink data.

The network device determines the actual transmit power for the first uplink data.

In a possible implementation, the transmission parameter includes the modulation and coding scheme MCS used to send the first uplink data.

That the network device determines an actual transmit power for the first uplink data based on the channel transmit power and a transmission parameter includes:

The network device determines that a modulation scheme of the MCS is binary phase shift keying BPSK or quadrature phase shift keying QPSK.

The network device determines the actual transmit power for the first uplink data.

In a possible implementation, the transmission parameter includes the power adjustment value used to send the first uplink data.

That the network device determines an actual transmit power for the first uplink data based on the channel transmit power and a transmission parameter includes:

The network device determines that power adjustment values obtained by the terminal device for K times each satisfy a second condition, where K is an integer greater than or equal to 1.

The network device determines the actual transmit power for the first uplink data.

In a possible implementation, the second condition is that the power adjustment values obtained by the terminal device for K times each are greater than or equal to a second threshold, and the second threshold is equal to 3 dBm.

In a possible implementation, the second condition is specifically that power adjustment values obtained by the terminal device for K consecutive times each are equal to the second threshold, and K is an integer greater than 1.

In a possible implementation, the actual transmit power is $p_r>(N/M)\times p_p$, where $p_p$ is the channel transmit power.

In a possible implementation, the actual transmit power is equal to the channel transmit power.

In a possible implementation, when N=1, a transmit power on the one antenna port is $p_0=p_p$; or when N=2, a transmit power on one of the two antenna ports is $p_0=0.5p_p$.

According to a sixth aspect, a data transmission method is provided. The method includes:

A network device determines a first precoding matrix used to precode first uplink data, where the first precoding matrix belongs to a first precoding matrix subset or a second precoding matrix subset of a precoding matrix set.

A transmit power for uplink data that is determined based on each of one or more precoding matrices in the first precoding matrix subset satisfies the following condition: a transmit power on one of antenna ports used to send the uplink data is $p_0>(1/M)\times p_p$, where a quantity of antenna ports used to send the uplink data is greater than or equal to 1 and less than M; and a transmit power for uplink data that is determined based on each of one or more precoding matrices in the second precoding matrix subset satisfies the following condition: a transmit power on one of the antenna ports used to send the uplink data is $p_0>(1/M)\times p_p$.

Herein, M is a quantity of antenna ports configured by the network device to send the first uplink data, M is an integer greater than 1, and $p_p$ is a channel transmit power for the uplink data.

The network device sends indication information used to indicate the first precoding matrix.

The network device receives the first uplink data.

Therefore, according to the data transmission method in this embodiment of this application, the first precoding subset and the second precoding subset are set in the precoding set; a transmit power for uplink data that is determined based on any precoding matrix in the first precoding matrix subset satisfies the following condition: a transmit power on one of the antenna ports used to send the uplink data is $p_0>(1/M)\times p_p$, where the quantity of antenna ports used to send the uplink data is greater than or equal to 1 and less than M; and a transmit power for uplink data that is determined based on any precoding matrix in the second precoding matrix subset satisfies the following condition: a transmit power on one of the antenna ports used to send the uplink data is $p_0=(1/M)\times p_p$. Therefore, the network device can dynamically indicate, from the two precoding matrix subsets, a precoding matrix used to send the to-be-sent uplink data, in other words, can flexibly determine the actual transmit power for the to-be-sent uplink data, thereby improving data transmission reliability.

In a possible implementation, the transmit power determined based on each of the one or more precoding matrices in the first precoding matrix subset specifically satisfies the following condition:

When the quantity of antenna ports used to send the uplink data is equal to 1, a transmit power on the one antenna port is $p_0=p_p$; or when the quantity of antenna ports used to send the uplink data is equal to 2, a transmit power on one of the two antenna ports is $p_0=0.5p_p$.

In other words, the actual transmit power determined based on each of the one or more precoding matrices in the first precoding matrix subset is equal to the channel transmit power.

Therefore, by enabling the actual transmit power to be equal to the channel transmit power, data transmission reliability can be improved to a maximum extent.

In a possible implementation, each precoding matrix in the precoding matrix set includes a phase and an amplitude quantized value, and the amplitude quantized value is used to determine the transmit power for the uplink data.

A phase of each of the one or more precoding matrices in the first precoding matrix subset is a phase of a precoding matrix included in the second precoding matrix subset.

A precoding matrix is indicated by using a bit field index value. Therefore, during implementation, a quantity of occupied bits is determined based on a quantity of precoding matrices included in the precoding matrix set. For example, if the quantity of bits is N, the N bits may indicate $2^n$ precoding matrices. However, actually, there may be some remaining bit values. Because the phase of the precoding matrix in the first precoding matrix subset is the phase of the precoding matrix in the second precoding subset, it means that the first precoding subset includes fewer precoding matrices. Therefore, the precoding matrix in the first precoding subset may be indicated by using a remaining bit value in the precoding matrix set, so that a precoding matrix with an adjusted amplitude quantized value can be indicated by using a reserved field, without changing a quantity of existing bits and without affecting flexibility of selecting an existing codeword.

According to a seventh aspect, a data transmission apparatus is provided. The apparatus may be configured to perform the operations performed by the terminal device according to the first aspect and the second aspect and any possible implementation thereof. Specifically, the apparatus may include modules or units configured to perform the operations performed by the terminal device according to the first aspect to the third aspect and any possible implementation thereof.

According to an eighth aspect, a data transmission apparatus is provided. The apparatus may be configured to perform the operations performed by the network device according to the third aspect and the fourth aspect and any possible implementation thereof. Specifically, the apparatus may include modules or units configured to perform the operations performed by the network device according to the fourth aspect to the sixth aspect and any possible implementation thereof.

According to a ninth aspect, a terminal device is provided. The terminal device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the terminal device is enabled to perform any method according to the first aspect to the third aspect and any possible implementation thereof, or the terminal device is enabled to implement the apparatus according to the seventh aspect.

According to a tenth aspect, a network device is provided. The network device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the network device is enabled to perform any method according to the fourth aspect to the sixth aspect and any possible implementation thereof, or the network device is enabled to implement the apparatus according to the eighth aspect.

According to an eleventh aspect, a chip system is provided. The chip system includes a memory and a processor. The memory is configured to store a computer program, and the processor is configured to invoke the computer program from the memory and run the computer program, so that a communications device in which the chip system is installed performs any method according to the first aspect to the sixth aspect and any possible implementation thereof.

According to a twelfth aspect, a computer program product is provided. The computer program product includes computer program code. When the computer program code is run by a communications unit, a processing unit, a transceiver, or a processor of a communications device (for example, a network device or a terminal device), the communications device is enabled to perform any method according to the first aspect to the sixth aspect and any possible implementation thereof.

According to a thirteenth aspect, a computer-readable storage medium is provided. The computer-readable storage medium stores a program, and the program enables a communications device (for example, a network device or a terminal device) to perform any method according to the first aspect to the sixth aspect and any possible implementation thereof.

According to a fourteenth aspect, a computer program is provided. When the computer program is executed on a computer, the computer is enabled to implement any method according to the first aspect to the sixth aspect and any possible implementation thereof.

DESCRIPTION OF EMBODIMENTS

Figure 1:
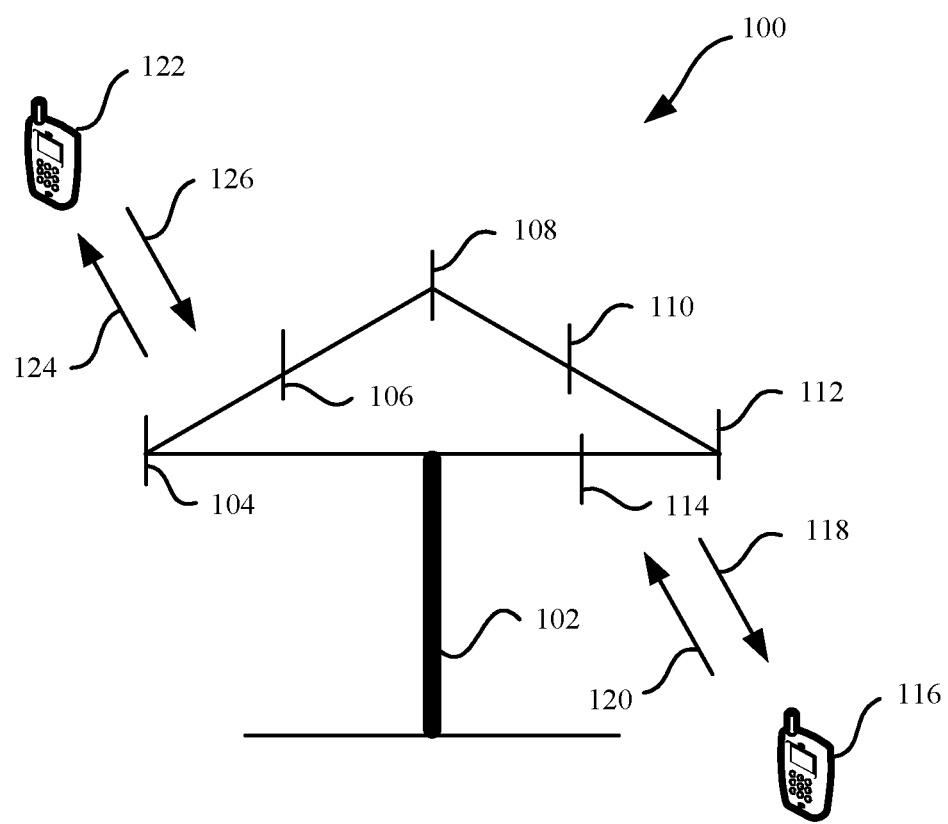
FIG. 1 is a schematic diagram of a communications system used in an embodiment of this application.

The following describes technical solutions of this application with reference to the accompanying drawings.

The technical solutions of the embodiments of this application may be applied to various communications systems, for example, a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, a future fifth-generation (5th generation, 5G) system, or a new radio (new radio, NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

A network device in the embodiments of this application may be a device configured to communicate with the terminal device. The network device may be a base transceiver station (base transceiver station, BTS) in the global system for mobile communications (global system for mobile communications, GSM) or the code division multiple access (code division multiple access, CDMA) system, or may be a NodeB (NodeB, NB) in the wideband code division multiple access (wideband code division multiple access, WCDMA) system, or may be an evolved NodeB (evolved NodeB, eNB or eNodeB) in the LTE system, or may be a radio controller in a cloud radio access network (cloud radio access network, CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system layer may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or may be performed by a function module that are in the terminal device or the network device and that can invoke and execute the program.

A next-generation mobile communications system makes future mobile data flow growth, the massive internet of things, diversified new services, and diversified application scenarios possible. In addition to serving as a universal connection framework, basic 5G new radio (new radio, NR) of a next-generation cellular network may further increase a data speed and a capacity of the network, improve reliability, efficiency, and a coverage capability of the network, reduce a latency of the network, and fully use each bit of available spectrum resource. Moreover, 5G based on an orthogonal frequency division multiplexing (orthogonal frequency division multiplexing, OFDM) new radio design becomes a global standard, and not only supports a 5G device and diversified deployment and covers diversified spectrums (including coverage on low and high frequency bands), but also supports diversified services and terminals.

As one of the technical means for implementing 5G NR, massive multiple-input multiple-output (multiple-input multiple-output, MIMO) uses high frequency bands through a large quantity of antennas in a base station, so that energy can be centrally transmitted to a user, to implement better coverage on these high frequency bands.

The MIMO technology means that a sending device and a receiving device respectively use a plurality of transmit antennas and a plurality of receive antennas, so that a signal is sent through the plurality of antennas of the sending device and received through the plurality of antennas of the receiving device, thereby improving communication quality. The MIMO technology can fully use spatial resources, implement multiple-input multiple-output through a plurality of antennas, and multi-fold increase a system channel capacity without increasing a spectrum resource and an antenna transmit power.

Specifically, the sending device performs bit mapping on a data bit that needs to be sent to the receiving device, to obtain a modulation symbol. The modulation symbol is mapped to a plurality of transport layers (layer) through layer mapping (layer mapping). A modulation symbol obtained through layer mapping is precoded (precoding), to obtain a precoded signal. The precoded signal is mapped to a plurality of resource elements (resource element, RE) through RE mapping. Then, these REs are transmitted through an antenna port (antenna port) after orthogonal multiplexing (orthogonal frequency division multiplexing, OFDM) modulation is performed.

To support simultaneous transmission of a plurality of layers of data flows, a corresponding antenna port is configured for each transport layer. In other words, each transport layer may correspond to one or more antenna ports. It should be noted that the antenna port herein may be understood as a logical port used for transmission, and has no one-to-one correspondence with a physical antenna port. The antenna port may be defined based on a pilot signal (for example, a demodulation reference signal (demodulation reference signal, DMRS)) used on the antenna. In other words, one DMRS corresponds to one antenna port.

FIG. 1 is a schematic diagram of a communications system used in an embodiment of this application. As shown in FIG. 1, the communications system 100 includes a network device 102. The network device 102 may include a plurality of antenna groups. Each antenna group may include one or more antennas. For example, one antenna group may include an antenna 104 and an antenna 106, another antenna group may include an antenna 108 and an antenna 110, and an additional group may include an antenna 112 and an antenna 114. FIG. 1 shows two antennas in each antenna group. However, each group may include more or fewer antennas. The network device 102 may additionally include a transmitter chain and a receiver chain. A person of ordinary skill in the art may understand that the transmitter chain and the receiver chain each may include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it can be understood that the network device 102 may communicate with any quantity of terminal devices that are similar to the terminal device 116 or the terminal device 122. The terminal device 116 and the terminal device 122 each may be, for example, a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal device 116 communicates with the antenna 112 and the antenna 114. The antenna 112 and the antenna 114 send information to the terminal device 116 over a forward link 118, and receive information from the terminal device 116 over a reverse link 120. In addition, the terminal device 122 communicates with the antenna 104 and the antenna 106. The antenna 104 and the antenna 106 send information to the terminal device 122 over a forward link 124, and receive information from the terminal device 122 over a reverse link 126.

For example, in a frequency division duplex FDD system, the forward link 118 may use a frequency band different from that used by the reverse link 120, and the forward link 124 may use a frequency band different from that used by the reverse link 126.

For another example, in a time division duplex TDD system and a full duplex (full duplex) system, the forward link 118 and the reverse link 120 may use a same frequency band, and the forward link 124 and the reverse link 126 may use a same frequency band.

Each antenna group and/or area designed for communication are/is referred to as a sector of the network device 102. For example, an antenna group may be designed for communication with a terminal device in a sector within a coverage area of the network device 102. In a process in which the network device 102 communicates with the terminal device 116 and the terminal device 122 respectively over the forward link 118 and the forward link 124, transmit antennas of the network device 102 may increase signal-to-noise ratios of the forward link 118 and the forward link 124 through beamforming. In addition, compared with a manner in which the network device sends, through a single antenna, a signal to all terminal devices served by the network device, when the network device 102 sends, through beamforming, a signal to the terminal device 116 and the terminal device 122 that are randomly distributed in a related coverage area, a mobile device in a neighboring cell is less interfered with.

In a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain a specific quantity of data bits to be sent to the wireless communications receiving apparatus through a channel. For example, the wireless communications sending apparatus may generate the specific quantity of data bits to be sent to the wireless communications receiving apparatus through the channel, receive the specific quantity of data bits from another communications apparatus, or store the specific quantity of data bits in a memory. These data bits may be included in one or more data transport blocks, and the transport block may be segmented into a plurality of code blocks.

In addition, the communications system 100 may be a public land mobile network PLMN network, a device-to-device (device to device, D2D) network, a machine-to-machine (machine to machine, M2M) network, or another network. FIG. 1 is merely an example of a simplified schematic diagram for ease of understanding, and the network may further include another network device that is not shown in FIG. 1.

Before the embodiments of this application are described, the following first briefly describes related terms or related descriptions in the embodiments of this application.

Antenna Port Configured by the Network Device to Send Uplink Data

The antenna port configured by the network device to send the uplink data indicates a quantity of antenna ports configured by the network device based on a quantity of antenna ports reported by the terminal device to send the uplink data. The network device may configure the quantity of antenna ports by using configuration information, and the configuration information may be used for implicit notification by configuring a quantity of ports of a sounding reference signal (sounding reference signal, SRS) resource. To be specific, if the quantity of ports of the SRS resource is set to 4, it means that the quantity of antenna ports used to transmit the uplink data is 4, and if the network device configures a plurality of SRS resources and the plurality of SRS resources have different quantities of ports, the quantity of antenna ports is determined based on one SRS resource indicated by an SRI field in DCI used to schedule the uplink data, or the quantity of antenna ports is determined based on a total quantity of ports of all the configured SRS resources. The configuration information also implicitly indicates a dimension of a precoding matrix indicated by a precoding matrix indicator field in the DCI used to schedule the uplink data.

In the embodiments of this application, M is used to indicate the quantity of antenna ports configured by the network device to send the uplink data.

It should be noted that, because the embodiments of this application relate to uplink transmission, unless otherwise specified, all antenna ports described in the context are antenna ports used by the terminal device to send the uplink data.

Antenna Port Used to Send the Uplink Data

The antenna port used to send the uplink data indicates a non-zero power antenna port used by the terminal device to send the uplink data, and a quantity of non-zero power antenna ports is less than or equal to M.

In the embodiments of this application, N is used to indicate the quantity of non-zero power antenna ports that are in the M antenna ports and that are used to send the uplink data.

The terminal device may determine N based on the transmitted precoding matrix indicator field in the DCI used to schedule the uplink data. The transmitted precoding matrix indicator field may be used to indicate that some or all of the antenna ports are selected for uplink transmission. In other words, N is less than or equal to M.

For example, if the quantity M of antenna ports configured by the network device to send the uplink data is 4, the quantity N of antenna ports used to send the uplink data may be any number less than or equal to 4. Specifically, a value of M may be set for the terminal device by using some fields, for example, "nrofSRS-Ports", and a value of N may also be set for the terminal device by using some fields, for example, "precoding information and number of layers".

Maximum Transmit Power Allowed by the Terminal Device

The maximum transmit power indicates a maximum capability of a power used by the terminal device to send the uplink data, or a maximum transmit power that can be supported by the terminal device. Optionally, the maximum transmit power may be a transmit power configured by the network device for the terminal device, and indicates a maximum transmit power that the network device allows the terminal device to use. Optionally, the maximum transmit power may alternatively be a maximum transmit power that is stipulated by the network device for the terminal device. In the embodiments of this application, $p_{max}$ is used to indicate the maximum transmit power.

Channel Transmit Power

During uplink transmission, there are different channel statuses in different time periods. Generally, poor channel quality indicates that a relatively high transmit power is required to send data, and good channel quality indicates that a relatively low transmit power may be used to send data. In addition, different quantities of frequency domain resources are occupied by uplink transmission in different time periods. Generally, a larger quantity of frequency domain resources indicates that a higher transmit power is required to send uplink data, and a smaller quantity of frequency domain resources indicates that a lower transmit power is required to send uplink data. Therefore, during uplink transmission, the transmit power is differently determined based on factors such as a channel status and frequency domain resource allocation.

The network device determines a configuration parameter of the transmit power based on the channel status and a scheduling policy indication. The transmit power that is determined by the terminal device based on the configuration parameter indicated by the network device and a signal measurement result of the terminal device may be referred to as the channel transmit power. During uplink transmission, the channel transmit power indicates a maximum transmit power that can be used by the terminal device to send the uplink data at a current moment.

In the embodiments of this application, $p_p$ is used to indicate the channel transmit power for the uplink data.

The terminal device may determine the channel transmit power $p_p$ of the uplink data by using the following formula:

$$p_{PUSCH,b,f,c}(i, j, q_d, l) = \begin{cases} p_{CMAX,f,c}(i) \\ p_{O\_PUSCH,b,f,c}(j) + 10\log_{10}(2^\mu \times M_{RB,b,f,c}^{PUSCH}(i)) + \alpha_{a,b,c}(j) \times \\ PL_{b,f,c}(q_d) + \Delta_{TF,b,f,c}(i) + f_{b,f,c}(i, l) \end{cases}$$

It should be noted that, in the following formula for determining the channel transmit power for the uplink data, the maximum transmit power $p_{max}$ is the same as $p_{CMAX,f,c}(i)$, and the channel transmit power $p_p$ is the same as $p_{PUSCH,b,f,c}(i,j,q_d,l)$.

The following explains physical meanings of parameters in the formula:

b is a bandwidth part (bandwidth part, BWP) occupied by physical uplink shared channel (physical uplink shared channel, PUSCH) transmission;

f is a carrier (carrier) occupied by PUSCH transmission;

c is a serving cell (serving cell) in which the carrier is located;

l is a power control parameter set configured by the network device by using higher layer signaling, where the following parameter values configured by using the higher layer signaling are all configured in the power control parameter set;

$p_{CMAX,f,c}(i)$ is the maximum transmit power;

$p_{O\_PUSCH,b,f,c}(j)$ is a parameter value configured by the network device by using the higher layer signaling, where when the network device configures a plurality of parameter values by using the higher layer, the terminal device further selects one of the plurality of parameter values based on a corresponding indicator field in downlink control information (downlink control information, DCI) for determining, or selects one of the plurality of parameter values based on a predefined rule for determining;

$\alpha_{a,b,c}(j)$ is a parameter value configured by the network device by using the higher layer signaling, where when the network device configures the plurality of parameter values by using the higher layer, the terminal device further selects one of the plurality of parameter values based on a corresponding indicator field in the downlink control information (downlink control information, DCI) for determining, or selects one of the plurality of parameter values based on the predefined rule for determining;

$M_{RB,b,f,c}^{PUSCH}(i)$ is a quantity of resource blocks (resource block, RB) occupied by a PUSCH $PL_{b,f,c}(q_d)$ is obtained through estimation based on a reference signal (reference resource, RS) configured by the network device;

a value of $\Delta_{TF,b,f,c}(i)$ is related to a quantity of transport layers, and may be related to a quantity of code blocks (code block), a code block size, a quantity of REs occupied by the PUSCH, and a type of data carried on the PUSCH, where a calculation manner of $\Delta_{TF,b,f,c}(i)$ is: $\Delta_{TF,b,f,c}(i)=10 \log ((2^{BPRE \cdot K_S}-1) \times \beta_{offset}^{PUSCH})$, where $K_S$ is indicated by using the higher layer signaling, a BPRE value is related to the quantity of code blocks (code block), the code block size, and the quantity of REs occupied by the PUSCH, and $\beta_{offset}^{PUSCH}$ is related to the type of the data carried on the PUSCH; and $f_{b,f,c}(i,l)$ is determined based on a transmit power control (transmission power control, TPC) indication carried in the DCI, where when TPC indicates a cumulative amount, $f_{b,f,c}(i,l)=f_{b,f,c}(i_{last},l)+\delta_{PUSCH,b,f,c}(i_{last},i,K_{PUSCH},l)$, and when TPC indicates an absolute amount, $f_{b,f,c}(i,l)=\delta_{PUSCH,b,f,c}(i_{last},i,K_{PUSCH},l)$.

In the prior art, the terminal device determines, based on the channel transmit power and the quantity M of antenna ports used to send the uplink data, a PUSCH transmit power used on each transmit port. For example, the transmit power on each transmit port is a ratio of the channel transmit power to M.

Actual Transmit Power

During uplink transmission, the quantity N of antenna ports used to send the uplink data is less than or equal to M, and the actual transmit power indicates a sum of transmit powers on the N antenna ports actually used by the terminal device to send the uplink data. The actual transmit power is less than or equal to the channel transmit power. In the embodiments of this application, $p_t$ is used to indicate the actual transmit power.

In the prior art, the actual transmit power is $p_t=(N/M) \times p_p$. When N is less than M, this operation may be understood as power scaling (scale) performed on the channel transmit power.

In the embodiments of this application, when N is less than M, the terminal device may determine whether to send the uplink data at the channel transmit power. In one case of sending the uplink data at the channel transmit power, in other words, the actual transmit power is equal to the channel transmit power, the terminal device does not perform a power scaling operation, and sends the uplink data at the channel transmit power. In another case of sending the uplink data at a power less than the channel transmit power, the terminal device may perform a power scaling (scale) operation, and send the uplink data at a scaled power (scaled power) obtained after the channel transmit power is scaled.

In an embodiment of this application, the actual transmit power may alternatively be a calculated value of the actual transmit power that is determined by the terminal device, or the actual transmit power may be a result obtained after scaling is performed based on the foregoing parameters and/or the values of M and N. Correspondingly, in an embodiment of this application, after the actual transmit power is allocated to the N antenna ports, an actual transmit power on each antenna port may be a calculated value determined by the terminal device, or may be a result obtained after scaling is performed based on the foregoing parameters and/or the values of M and N.

Codebook-Based Uplink Transmission

As described above, data obtained after layer mapping needs to be precoded, to be specific, the data is precoded by using a precoding matrix. During codebook-based uplink transmission, the network device and the terminal device each may store, according to a protocol, a codebook for uplink transmission. The codebook includes a plurality of precoding matrices. Each precoding matrix includes two parts: an amplitude quantized value and a phase. For example, for a precoding matrix with two transport layers $$W = \frac{1}{2}\begin{bmatrix} 1 & 0 \\ 0 & 1 \\ 0 & 0 \\ 0 & 0 \end{bmatrix},$$

an amplitude quantized value is ½, and a phase rotation relationship of all antenna ports (each row in the matrix corresponds to one antenna port) may be represented as $$\begin{bmatrix} 1 & 0 \\ 0 & 1 \\ 0 & 0 \\ 0 & 0 \end{bmatrix}.$$

During uplink transmission, there are different codebooks for different values of M and different quantities of transport layers. As shown in Table 1 to Table 3, Table 1 shows a codebook including a precoding matrix with two antenna ports and one transport layer, Table 2 shows a codebook including a precoding matrix with four antenna ports and one transport layer, and Table 3 shows a codebook including a precoding matrix with four antenna ports and one transport layer. In each table, one precoding matrix corresponds to one index, which may be referred to as a precoding indicator (transmission precoding matrix indicator, TPMI) index. In other words, a precoding indicator index is used to indicate a corresponding precoding matrix. The index is used to determine a precoding matrix corresponding to a TPMI indicated by a precoding matrix indicator field in DCI.

Based on a capability of coherence between antenna ports of the terminal device, there are three types of precoding matrices: a full-coherent (full-coherent) capability precoding matrix, a partial-coherent (partial-coherent) capability precoding matrix, and a non-coherent (non-coherent) capability precoding matrix. The following separately describes the three types of precoding matrices.

The full-coherent (full-coherent) capability precoding matrix indicates that phase calibration is completed between all the antenna ports (the M antenna ports) configured by the network device to send the uplink data, and therefore phase weighting can be performed. In other words, all antenna ports can be used to send the uplink data at one transport layer. For example, a precoding matrix indicated by each of the TPMI index values 2 to 5 in Table 1, a precoding matrix indicated by each of the TPMI index values 12 to 27 in Table 2, and a precoding matrix indicated by each of the TPMI index values 14 to 21 in Table 3 are all full-coherent capability precoding matrices.

The partial-coherent (partial-coherent) capability precoding matrix indicates that phase calibration is completed between each pair of antenna ports used by the terminal device to send the uplink data, and therefore phase weighting can be performed, but phase calibration is not completed between one pair of antenna ports of the terminal device, and therefore phase weighting cannot be performed. In other words, two antenna ports between which calibration is completed can be used to send the uplink data at one transport layer. For example, a precoding matrix indicated by each of the TPMI index values 4 to 11 in Table 2 and a precoding matrix indicated by each of the TPMI index values 6 to 13 in Table 3 are partial-coherent capability precoding matrices.

The non-coherent (non-coherent) capability precoding matrix indicates that phase calibration is not completed between all the antenna ports that can be used by the terminal device to send the uplink data, and therefore phase weighting cannot be performed. In other words, only one antenna port can be used to send the uplink data at one transport layer. For example, a precoding matrix indicated by each of TPMI index values 0 and 1 in Table 1, a precoding matrix indicated by each of the TPMI index values 0 to 3 in Table 2, and a precoding matrix indicated by each of the TPMI index values 0 to 5 in Table 3 are all non-coherent capability precoding matrices.

TABLE 1

| TPMI index | W |
|---|---|
| 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$ — — |

TABLE 2

| TPMI index | W |
|---|---|
| 0-7 | $\frac{1}{2}\begin{bmatrix}1\\0\\0\\0\end{bmatrix}$  $\frac{1}{2}\begin{bmatrix}0\\1\\0\\0\end{bmatrix}$  $\frac{1}{2}\begin{bmatrix}0\\0\\1\\0\end{bmatrix}$  $\frac{1}{2}\begin{bmatrix}0\\0\\0\\1\end{bmatrix}$  $\frac{1}{2}\begin{bmatrix}1\\0\\1\\0\end{bmatrix}$  $\frac{1}{2}\begin{bmatrix}1\\0\\-1\\0\end{bmatrix}$  $\frac{1}{2}\begin{bmatrix}1\\0\\j\\0\end{bmatrix}$  $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$  $\frac{1}{2}\begin{bmatrix}0\\1\\0\\-1\end{bmatrix}$  $\frac{1}{2}\begin{bmatrix}0\\1\\0\\j\end{bmatrix}$  $\frac{1}{2}\begin{bmatrix}0\\1\\0\\-j\end{bmatrix}$  $\frac{1}{2}\begin{bmatrix}1\\1\\1\\1\end{bmatrix}$  $\frac{1}{2}\begin{bmatrix}1\\1\\j\\j\end{bmatrix}$  $\frac{1}{2}\begin{bmatrix}1\\1\\-1\\-1\end{bmatrix}$  $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$  $\frac{1}{2}\begin{bmatrix}1\\j\\j\\-1\end{bmatrix}$  $\frac{1}{2}\begin{bmatrix}1\\j\\-1\\-j\end{bmatrix}$  $\frac{1}{2}\begin{bmatrix}1\\j\\-j\\-1\end{bmatrix}$  $\frac{1}{2}\begin{bmatrix}1\\-1\\1\\-1\end{bmatrix}$  $\frac{1}{2}\begin{bmatrix}1\\-1\\j\\-j\end{bmatrix}$  $\frac{1}{2}\begin{bmatrix}1\\-1\\-1\\1\end{bmatrix}$  $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$  $\frac{1}{2}\begin{bmatrix}1\\-j\\j\\1\end{bmatrix}$  $\frac{1}{2}\begin{bmatrix}1\\-j\\-1\\j\end{bmatrix}$  $\frac{1}{2}\begin{bmatrix}1\\-j\\-j\\-1\end{bmatrix}$ — — — — |

TABLE 3

| TPMI index | W | | | |
|---|---|---|---|---|
| 0-3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4-7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8-11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

Relationship between a precoding matrix and each of M, N, and a quantity of transport layers In one precoding matrix, a rank of the precoding matrix indicates the quantity of transport layers, a quantity of rows in the precoding matrix indicates the quantity M of antenna ports configured by the network device to send the uplink data, and a quantity of non-zero rows indicates the quantity N of antenna ports used to send the uplink data.

For example, for a precoding matrix $$W = \frac{1}{2}\begin{bmatrix} 1 & 0 \\ 0 & 1 \\ 0 & 0 \\ 0 & 0 \end{bmatrix},$$

that a rank of the precoding matrix is 2 indicates that a quantity of transport layers is 2, that a quantity of rows in the precoding matrix is 4 indicates that M is 4, and a quantity of non-zero rows is 2 indicates that N is 2. One antenna port (corresponding to a quantity of non-zero values in each column in the matrix) is used at one transport layer to send uplink data.

The foregoing describes in detail the precoding matrix types. Herein, the relationship between a precoding matrix and each of M, N, and a quantity of transport layers is further described with reference to the precoding matrix types.

For the full-coherent capability precoding matrix, in a process of precoding uplink data and sending the uplink data by using the full-coherent capability precoding matrix, regardless of a quantity of transport layers, N=M, and all antenna ports are used at one transport layer to send the uplink data.

For the partial-coherent capability precoding matrix, in a process of precoding uplink data and sending the uplink data by using the partial-coherent capability precoding matrix, a specific relationship between N and M is related to a quantity of transport layers. For example, for the partial-coherent capability precoding matrix shown in Table 2, M=4, N=2, a quantity of transport layers is 1, and two antenna ports are used at one transport layer to send the uplink data. For another example, for the partial-coherent capability precoding matrix shown in Table 3, N=M=4, a quantity of transport layers is 2, and two antenna ports are also used at one transport layer to send the uplink data. However, antenna ports used at different transport layers are different. Specifically, for example, an antenna port #1 and an antenna port #3 are used at a transport layer #1, and an antenna port #2 and an antenna port #4 are used at a transport layer #2. It can be understood that a transmit antenna #1 and a transmit antenna #3 corresponding to the transmit antenna #1 may be considered as a transmit antenna pair.

Similarly, for the non-coherent capability precoding matrix, in a process of precoding uplink data and sending the uplink data by using the non-coherent capability precoding matrix, a specific relationship between N and M is related to a quantity of transport layers. For example, for the non-coherent capability precoding matrix shown in Table 2, M=4, N=1, a quantity of transport layers is 1, and one antenna port is used at one transport layer to send the uplink data. For another example, for the non-coherent capability precoding matrix shown in Table 3, M=4, N=2, a quantity of transport layers is 2, one antenna port is used at one transport layer to send the uplink data, and antenna ports used at different transport layers are different. For another example, for a precoding matrix with four transmit antennas and four transport layers, M=4=N, one antenna port is used at one transport layer to send the uplink data, and antenna ports used at any two of the four transport layers are different.

In an embodiment, M and N in this application may be parameters determined by the terminal device, or may be parameters configured for the terminal device. Both M and N may be determined by the terminal device; or both M and N may be configured; or one of M and N may be configured, and the other is determined by the terminal device. After the terminal device performs calculation based on N, an actual quantity of actually used antenna ports is less than N. In an embodiment, N is a quantity of ports used by the terminal device to transmit data at a non-zero power.

Relationship Between an Actual Transmit Power and a Precoding Matrix

In the embodiments of this application, a ratio of the actual transmit power $p_t$ to the channel transmit power $p_p$ may be referred to as a power control factor, and t is used to indicate the power control factor.

As described above, a precoding matrix includes an amplitude quantized value and a phase. The amplitude quantized value can indicate a transmit power on each non-zero antenna port, and further can indicate a power control factor. A relationship between a power control factor and an amplitude quantized value is: $t=\lambda^2 \times l \times N$, where $\lambda$ indicates the amplitude quantized value, and l indicates a quantity of transport layers corresponding to each antenna port or a quantity of transport layers at which a same antenna port is used to send data. In this way, the actual transmit power is $p_t=t\times p_p=(\lambda^2\times l)\times N\times p_p$, and a transmit power on each antenna port is $p_0=(\lambda^2\times l)\times p_p$.

With reference to the precoding matrix with four antenna ports and one transport layer transmission shown in Table 2 and the precoding matrix with four antenna ports and two-layer transmission shown in Table 3, the following describes a relationship between a power control factor and a precoding matrix by using an example in which M is 4.

For example, in Table 2, if a TPMI index value is 0, a precoding codebook type is a non-coherent capability precoding matrix (l=1), an amplitude quantized value is ½, N=1, a power control factor is $t=(½)^2=¼$, and a transmit power on each antenna port is $p_0=(\lambda^2\times l)\times p_p=(¼)\times p_p$.

For another example, in Table 3, if a TPMI index value is 0, a precoding matrix type is a non-coherent capability precoding matrix (l=1), an amplitude quantized value is ½, N=2, a power control factor is $t=(½)^2\times 2=½$, and a transmit power on each antenna port is $p_0=(\lambda^2\times l)\times p_p=(¼)\times p_p$.

For another example, in Table 3, if a TPMI index value is 7, a precoding matrix type is a partial-coherent capability precoding matrix (l=1), an amplitude quantized value is ½, N=4, a power control factor is $t=(½)^2\times 4=1$, and a transmit power on each antenna port is $p_0=(\lambda^2\times l)\times p_p=(¼)\times p_p$.

For another example, in Table 3, if a TPMI index value is 16, a precoding matrix type is a full-coherent capability precoding matrix (l=2), an amplitude quantized value is $$\frac{1}{2\sqrt{2}},$$

N=4, a power control factor is $$t=\left(\frac{1}{2\sqrt{2}}\right)^2\times 2\times 4=1,$$

and a transmit power on each antenna port is $p_0=(\lambda^2\times l)\times p_p=(¼)\times p_p$.

The foregoing briefly describes the related terms or related technologies in the embodiments of this application. The following briefly describes the prior art related to this application with reference to the background.

During uplink transmission in the prior art, the actual transmit power at which the terminal device sends the uplink data through the N antenna ports is $p_t=(N/M)\times p_p$. It can be learned from the foregoing formula that, when N is less than M, the actual transmit power is always less than the channel transmit power. Actually, in some scenarios, if the actual transmit power is always less than the channel transmit power, data transmission reliability is affected. Therefore, the embodiments of this application provide a data transmission method, to flexibly adjust an actual transmit power for data, thereby improving data transmission reliability.

It should be noted that the actual transmit power obtained by using the formula $p_t=(N/M)\times p_p$ and the actual transmit power obtained by using the foregoing formula $p_t=t\times p_p=(\lambda^2\times l)\times N\times p_p$ are the same, and the two different formulas merely describe a manner of determining the actual transmit power from different perspectives.

It should be further noted that, regardless of the prior art or the embodiments of this application, the following relationship always exists between the power control factor t and the amplitude quantized value $\lambda$: $t=(\lambda^2\times l)\times N$. Correspondingly, the following relationship always exists between the actual transmit power and the channel transmit power: $p_t=t\times p_p=(\lambda^2\times l)\times N\times p_p$.

Figure 2:
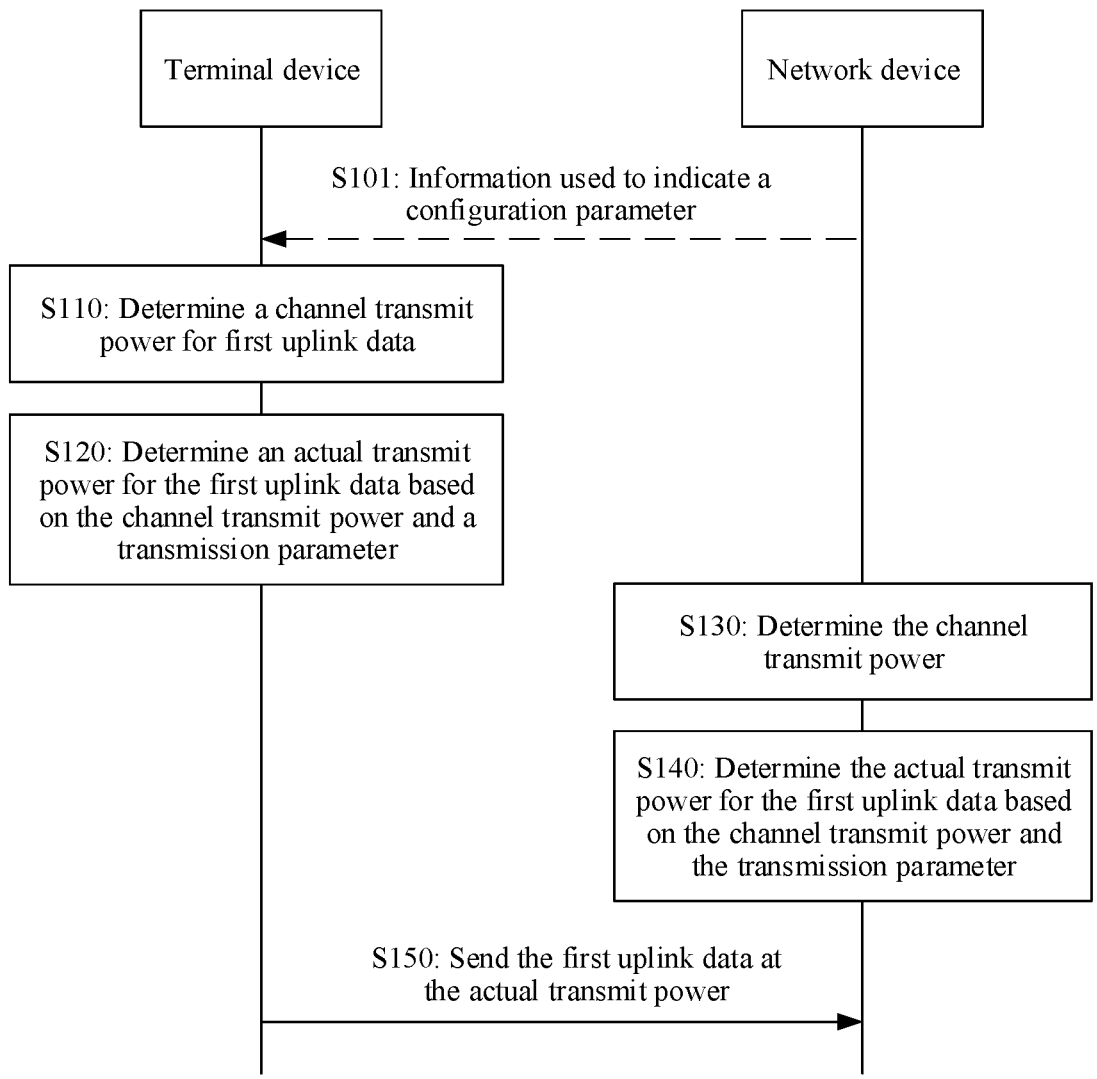
FIG. 2 is a schematic interaction diagram of a data transmission method according to an embodiment of this application.
Figure 3:
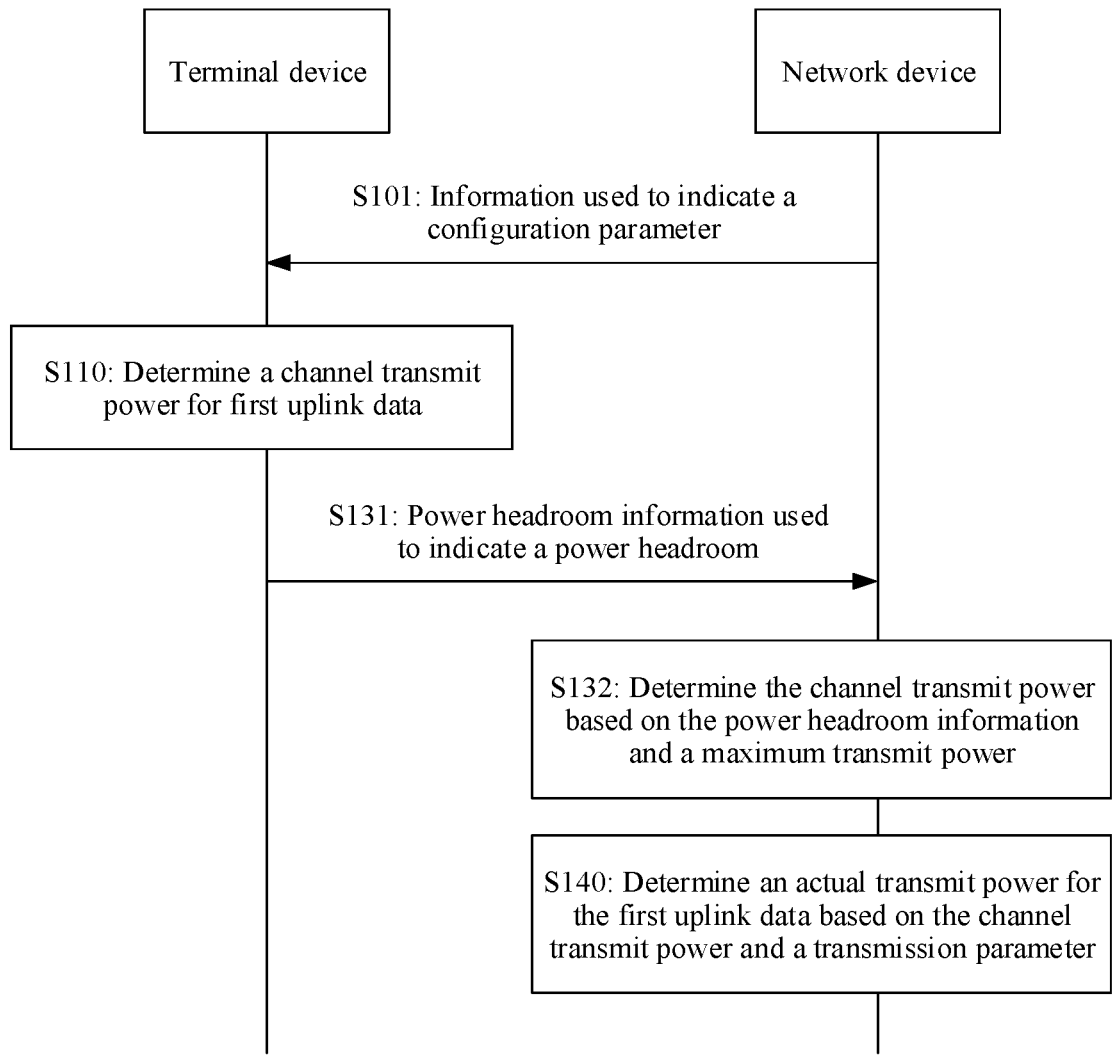
FIG. 3 is another schematic interaction diagram of a data transmission method according to an embodiment of this application.

The following describes in detail the embodiments of this application with reference to FIG. 2 and FIG. 3.

FIG. 2 is a schematic interaction diagram of a data transmission method 100 according to an embodiment of this application. The following describes in detail steps in the method 100.

In S101, a network device sends, to a terminal device, information used to indicate a configuration parameter, where the configuration parameter is used to determine a channel transmit power.

For example, the configuration parameter may include some of the parameters in the foregoing formula for determining the channel transmit power, or may include parameters used to determine the other parameters in the foregoing formula.

For example, the configuration parameter includes a maximum transmit power (for example, $p_{CMAX,f,c}(i)$), a quantity of resource blocks (resource block, RB) occupied by a PUSCH used to carry uplink data (for example, $M_{RB,b,f,c}^{PUSCH}(i)$), and other related parameters (for example, $p_{O\_PUSCH,b,f,c}(j)$ and $\alpha_{a,b,c}(j)$). The configuration parameter further includes a parameter such as an RS (the terminal device may determine $PL_{b,f,c}(q_d)$ based on the RS) or a power adjustment value (the terminal device may determine $f_{b,f,c}(i,l)$ based on the power adjustment value). In this way, the terminal device can determine the channel transmit power based on the received configuration parameter.

For specific descriptions of the configuration parameter, refer to the foregoing descriptions of the parameters in the foregoing formula for determining the channel transmit power. For brevity, details are not described herein again.

In S110, the terminal device determines the channel transmit power for to-be-sent first uplink data based on the configuration parameter.

As described above, the terminal device may determine the channel transmit power based on the following formula. For explanation of each configuration parameter, refer to the foregoing descriptions. Alternatively, the terminal device may determine the channel transmit power in another manner. In addition, it should be further noted that, in the following formula for determining the channel transmit power, the maximum transmit power $p_{CMAX,f,c}(i)$ is the same as $p_{max}$, and the channel transmit power $p_{PUSCH,b,f,c}(i,j,q_d,l)$ is the same as $p_p$.

$$p_{PUSCH,b,f,c}(i, j, q_d, l) = \begin{cases} p_{CMAX,f,c}(i) \\ p_{O\_PUSCH,b,f,c}(j) + 10\log_{10}\left(2^\mu \square M_{RB,b,f,c}^{PUSCH}(i)\right) + \alpha_{a,b,c}(j)\square PL_{b,f,c}(q_d) + \Delta_{TF,b,f,c}(i) + f_{b,f,c}(i, l) \end{cases}$$

In S120, the terminal device determines an actual transmit power for the first uplink data based on the channel transmit power and a transmission parameter, where the actual transmit power is less than or equal to the channel transmit power, and the transmission parameter includes one or more of the following:

a power headroom, where the power headroom indicates a difference between a maximum transmit power allowed by the terminal device and the channel transmit power, and the channel transmit power is less than or equal to the maximum transmit power allowed by the terminal device; or
a waveform used to send the first uplink data; or
a downlink control information DCI format used to schedule the first uplink data; or
a modulation and coding scheme MCS used to send the first uplink data; or
a power adjustment value used to send the first uplink data.

Specifically, the transmission parameter may indicate, to some extent, whether the terminal device is located at a cell edge, so that the actual transmit power for the first uplink data can be determined based on the transmission parameter and the determined channel transmit power. The actual transmit power indicates a sum of transmit powers on N antenna ports used by the terminal device to send the first uplink data.

When N is equal to M, the actual transmit power is naturally equal to the channel transmit power.

When N is less than M, the actual transmit power may be less than the channel transmit power, or may be equal to the channel transmit power. A specific case may be further determined by using the transmission parameter. In addition, if the actual transmit power is less than the channel transmit power, the actual transmit power may be understood as a scaled transmit power obtained after the terminal device performs a power scaling operation based on the channel transmit power and the transmission parameter.

In an embodiment, that the actual transmit power is a sum of transmit powers on N antenna ports used to send the first uplink data is optional. The actual transmit power may alternatively be determined by using another constraint.

The following describes each transmission parameter in detail.

Power Headroom

Generally, if the power headroom is relatively low, it indicates that there is a high probability that the terminal device is located at the cell edge, and a channel status such as a signal to interference plus noise ratio (signal to interference plus noise ratio, SINR) is relatively low. If the power headroom is relatively high, it indicates that there is a high probability that the terminal device is located in a cell center. It should be understood that, similar to that the power headroom indicates a location of the terminal device in a cell, the power headroom may alternatively be merely replaced with the allowed maximum transmit power, and the terminal device determines the power headroom through calculation based on the allowed maximum transmit power and the channel transmit power. It should be further understood that the power headroom may alternatively be generated based on the maximum transmit power allowed by the terminal device and the channel transmit power, and is not limited to the difference between the two powers. For example, the power headroom may be a result obtained by rounding up or rounding down the difference between the two powers.

Waveform

The waveform is a waveform used during data modulation. The waveform may be a discrete Fourier transform spread orthogonal frequency division multiplexing (discrete fourier transform spread orthogonal frequency division multiple, DFT-s OFDM) waveform, a cyclic prefix orthogonal frequency division multiplexing (cyclic prefix orthogonal frequency division multiple, CP-OFDM) waveform, or the like.

Generally, the waveform used for uplink transmission is switched based on whether the terminal device is located at the cell edge or whether the terminal device is in a power-limited state. For example, if the DFT-s-OFDM waveform is used, it indicates that there is a high probability that the terminal device is located at the cell edge or the terminal device is in a power-limited state (in other words, transmission performance is improved with a power increase). If the CP-OFDM waveform is used, it indicates that there is a high probability that the terminal device is located in the cell center or the terminal device is not in a power-limited state.

DCI Format

The DCI format may be any one of a plurality of DCI formats used to schedule the uplink data. For example, the DCI format may be a DCI format 0_0 or a DCI format 0_1. A DCI format including a smallest quantity of bits in the plurality of types of DCI used to schedule the uplink data may be referred to as a compact DCI format, for example, the DCI format 0_0.

Generally, the DCI format detected by the terminal device is sent by the network device to the terminal device based on whether the terminal device is located at the cell edge. For example, if the DCI format 0_0 is used, it indicates that there is a high probability that the terminal device is located at the cell edge. If the DCI format 0_1 is used, it indicates that there is a high probability that the terminal device is located in the cell center.

MCS

A modulation scheme of the MCS may be any one of the following four modulation schemes: binary phase shift keying (binary Phase Shift Keying, BPSK), quadrature phase shift keying (Quadrature Phase Shift Keying, QPSK), 16 quadrature amplitude modulation (Quadrature Amplitude Modulation), and 64QAM, where 16QAM indicates a QAM modulation scheme including 16 symbols, and 64QAM indicates a QAM modulation scheme including 64 symbols.

Generally, the MCS used by the terminal device for data modulation is determined based on current channel quality. A low modulation order in the modulation scheme of the MCS indicates poor channel quality, and therefore indicates that there is a high possibility that the terminal device is located at the cell edge, for example, BPSK or QPSK. A high modulation order in the modulation scheme of the MCS indicates good channel quality, and therefore indicates that there is a high probability that the terminal device is located in the cell center, for example, 16QAM or 64QAM.

Power Adjustment Value

The power adjustment value is a parameter indicating a channel status. Generally, a large power adjustment value indicates poor channel quality, and therefore indicates that there is a high possibility that the terminal device is located at the cell edge. A small power adjustment value indicates good channel quality, and therefore indicates that there is a high possibility that the terminal device is located in the cell center or has reached the maximum transmit power.

The power adjustment value may be a cumulative value, and the cumulative value is determined based on a sum of previously determined $\delta_{PUSCH,b,f,c}$ and $\delta_{PUSCH,b,f,c}$ indicated by current DCI. Alternatively, the power adjustment value may be an absolute value, and the absolute value is directly calculated based on $\delta_{PUSCH,b,f,c}$ indicated by TPC in current DCI. An example in which the parameter is a transmission power control (transmission power control, TPC) field is used. The power adjustment value indicated by the TPC field may be a power adjustment value corresponding to any field value (or a bit value) in Table 4.

It should be understood that the foregoing transmission parameters are merely examples, and there may be another related transmission parameter. In this embodiment of this application, the network device may indicate the transmission parameter by using a bit value in indication information, and the terminal device determines specific content of the transmission parameter by using the bit value, or the terminal device may determine specific content of the transmission parameter by using another parameter. This is not limited in this embodiment of this application. All transmission parameter determining manners fall within the protection scope of the embodiments of this application. For example, during specific application, the transmission parameter may be an indicated value, or content implicitly or explicitly indicated by another parameter. For example, the power headroom may have a plurality of values, and one power headroom value or level is indicated by using an indication 01. The terminal device calculates or queries a corresponding association relationship based on an indicated value or level to determine a calculation input parameter. For another example, if the transmission parameter includes the power value, the power headroom may be determined by using the difference between the maximum transmit power $p_{max}$ and the channel transmit power $p_p$. For another example, if the transmission parameter includes the waveform, a bit value in waveform information that is sent by the network device and that is used to indicate the waveform may be used to determine whether the waveform is the DFT-s-OFDM waveform or the CP-OFDM waveform.

TABLE 4

| Field value | Cumulative $\delta_{PUSCH,b,f,c}$ [dBm] | Absolute $\delta_{PUSCH,b,f,c}$ [dBm] |
| --- | --- | --- |
| 0 | −1 | −4 |
| 1 | 0 | −1 |
| 2 | 1 | 1 |
| 3 | 3 | 4 |

In S150, the terminal device sends the first uplink data at the actual transmit power.

Correspondingly, the network device receives the first uplink data.

In a possible implementation, the method further includes:

The terminal device evenly allocates the actual transmit power to the N antenna ports used to send the first uplink data.

Therefore, in S150, the terminal device specifically sends the uplink data through the N antenna ports at a transmit power corresponding to each antenna port, to complete a process of sending the first uplink data.

In this embodiment of this application, the actual transmit power is determined by the terminal device. However, in some cases, the network device also needs to determine the actual transmit power to determine a scheduling policy of the network device, for example, to select a precoding matrix used for data transmission.

It can be understood that the terminal device and the network device may determine the actual transmit power for the first uplink data in a same manner, so that the terminal device and the network device have a consistent understanding of the actual transmit power for the first uplink data.

In this embodiment of this application, the network device may determine the actual transmit power in various manners. The following describes two manners.

Manner 1

The network device determines the actual transmit power by using the channel transmit power and the transmission parameter.

By using S130 and S140, the following describes a process in which the network device determines the actual transmit power.

In S130, the network device determines the channel transmit power.

Referring to FIG. 3, in a possible implementation, a specific process in which the network device determines the channel transmit power is as follows:

After determining the channel transmit power in S110, the terminal device may calculate the difference between the maximum transmit power and the channel transmit power to obtain the power headroom.

In S131, the terminal device sends, to the network device, power headroom information used to indicate the power headroom.

Specifically, the terminal device may indicate the power headroom by using an uplink resource periodically configured by the network device. The periodically configured uplink resource may be an uplink resource used for PUSCH transmission or PUCCH transmission. The terminal device may further report the power headroom based on an event. The event is that the power headroom is greater than or equal to a threshold. When the event occurs, the terminal device may report the power headroom by using an uplink resource occupied by the first PUSCH transmission performed after the event occurs. A specific reporting format and a resource occupied to report the power headroom may be predefined, or may be configured by the network device by using higher layer signaling. The resource occupied to report the power headroom is a part of the uplink resource occupied by PUSCH transmission. Alternatively, the terminal device may report the power headroom by using an uplink resource occupied by PUCCH transmission that first satisfies a requirement and that is performed after the event occurs. A specific reporting format and a resource occupied to report the power headroom may be predefined, or may be configured by the network device by using higher layer signaling. The resource occupied to report the power headroom is a part of the uplink resource occupied by PUCCH transmission. The requirement may be that the uplink resource occupied by PUCCH transmission may further carry a quantity of bits for reporting the power headroom in addition to a first quantity of bits. The first quantity of bits is a quantity of bits that can carry UCI in a PUCCH and that are determined based on a PUCCH resource indicated by the network device and a quantity of UCI bits that need to be currently reported (including a quantity of HARQ bits and a quantity of CSI bits, and excluding the power headroom information). The quantity of bits for reporting the power headroom may correspond to an absolute power headroom value. For example, it is defined that power headroom values in an integer value range of [0, 23]/[0, 26] correspond to different bit values based on a specific step. Alternatively, relative power headroom values relative to the maximum transmit power correspond to different bit values based on a specific step. Alternatively, only an indication corresponding to one bit is used to indicate that the first threshold is exceeded, or the like.

In S132, the network device determines the channel transmit power based on the power headroom information and the maximum transmit power.

The maximum transmit power is configured by the network device for the terminal device. Therefore, when determining the maximum transmit power, the network device may determine the channel transmit power based on the maximum transmit power and the power headroom obtained from the power headroom information.

In S140, the network device determines the actual transmit power for the first uplink data based on the channel transmit power and the transmission parameter.

For the description of S140, refer to the description of S120. Only execution bodies are different, and manners of determining the actual transmit power are the same. In addition, for ease of description, a manner of determining the actual transmit power based on the channel transmit power and the transmission parameter is specifically described below from the perspective of the terminal device. For a manner in which the network device determines the actual transmit power based on the channel transmit power and the transmission parameter, refer to the descriptions of the terminal device. For brevity, details are not described subsequently.

Herein, both S130 and S140 may be performed before S120 or S150, or may be performed after S120 or S150. This is not limited in this embodiment of this application.

Manner 2

After determining the actual transmit power, the terminal device may send, to the network device, information used to indicate the actual transmit power, so that the network device determines the actual transmit power based on the information.

Therefore, according to the data transmission method provided in this embodiment of this application, when the actual quantity N of antenna ports used to send the uplink data is less than the quantity M of antenna ports configured by the network device to send the uplink data, the actual transmit power for the uplink data may be determined based on the channel transmit power and various transmission parameters that can indicate whether the terminal device is located at the cell edge, so that the actual transmit power for the uplink data is flexibly adjusted, thereby improving data transmission reliability.

It should be understood that sequence numbers of the foregoing processes do not mean execution sequences in all method steps in this embodiment of this application. The execution sequences of the processes should be determined based on functions and internal logic of the processes, and should not be construed as any limitation on the implementation processes of this embodiment of this application.

Generally, a terminal device located at a cell edge needs to send uplink data at a high power, and a terminal device located in a cell center may send uplink data at a low power. In this embodiment of this application, when N is less than M, the actual transmit power determined by the terminal device based on the channel transmit power and the transmission parameter may be less than or equal to the channel transmit power.

If it is determined, based on the transmission parameter, that the terminal device is located at a non-cell edge, the actual transmit power may be determined in a prior-art manner, in other words, $p_t=(N/M) \times p_p$. This can save a transmit power of the terminal device, and also avoid uplink interference caused by an unnecessary power increase. When N is less than M, the actual transmit power is less than the channel transmit power, or the actual transmit power is a scaled transmit power obtained after the terminal device performs a power scaling operation.

If it is determined, based on the transmission parameter, that the terminal device is located at the cell edge, the actual transmit power is not determined in a prior-art manner, and instead, the actual transmit power needs to be obtained by increasing a transmit power. In this case, the actual transmit power is $p_t>(N/M) \times p_p$.

In addition, the actual transmit power is less than or equal to the channel transmit power. A specific amount to which the transmit power is increased may be specified according to a protocol, or may be determined based on an indication of the network device. This is not limited in this embodiment of this application.

With reference to the foregoing transmission parameters, the following describes in detail the determined actual transmit power in different cases.

Case 1

The actual transmit power is determined based on the channel transmit power and the power headroom.

In this case, if the power headroom satisfies a first condition, the determined actual transmit power is $p_t>(N/M) \times p_p$; or when the power headroom does not satisfy the first condition, the actual transmit power is $p_t=(N/M) \times p_p$. The first condition is used to determine that the terminal device is located at a cell edge. In this embodiment of this application, that $p_r>(N/M)\times p_p$ and $p_r=(N/M)\times p_p$ may be merely examples, and there may be another constraint to be satisfied.

In an embodiment, there may be a plurality of explanations about that the power headroom satisfies the first condition. For example, that the power headroom satisfies the first condition may be a judging process. To be specific, in one case in which the terminal device determines whether the power headroom satisfies the first condition, the terminal device determines that the power headroom satisfies the first condition, and the terminal device determines the actual transmit power, where the determined actual transmit power satisfies some constraints. For another example, that the power headroom satisfies the first condition may alternatively be a process of performing judging and determining based on the power headroom, or a parameter value associated with the power headroom, or a power headroom level, or a related indication. For another example, that the power headroom satisfies the first condition may alternatively be a process of determining the actual transmit power or a constraint relationship of the actual transmit power based on a constraint association relationship between a power headroom value (or a power headroom level) and a transmit power. Descriptions of the following cases are similar to those herein.

In a possible implementation, the first condition is that the power headroom is greater than or equal to the first threshold.

Generally, if the power headroom is relatively low, it indicates that there is a high probability that the terminal device is located at the cell edge, and a channel status such as a signal to interference plus noise ratio (signal to interference plus noise ratio, SINR) is relatively low. In this case, the transmit power needs to be increased, and the actual transmit power is $p_r>(N/M)\times p_p$. If the power headroom is relatively high, it indicates that there is a high probability that the terminal device is located in the cell center. In this case, the transmit power does not need to be increased, and the actual transmit power is $p_r=(N/M)\times p_p$. This saves the transmit power of the terminal device, and also avoids uplink interference caused by an unnecessary power increase.

Alternatively, the first threshold may be associated with some parameters. For example, the first threshold is associated with antenna port information. If the first condition is that the power headroom is greater than or equal to the first threshold, the first threshold may have one or more of the following association relationships:

When N=1 and M=4, the first threshold is equal to 6 dBm; or when N=2 and M=4, the first threshold is equal to 3 dBm; or when N=1 and M=2, the first threshold is equal to 3 dBm.

Specifically, a case in which N=1, M=4, and the first threshold is 6 dBm may also be specifically the following scenario: M=4, a precoding matrix is a non-coherent capability precoding matrix, a quantity of transport layers is 1, and the corresponding first threshold is 6 dBm. Likewise, a case in which N=2, M=4, and the first threshold is equal to 3 dBm may also be specifically the following scenario: M=4, a precoding matrix is a partial-coherent capability precoding matrix, a quantity of transport layers is 2, and the corresponding first thresholds is 3 dBm; or M=4, a precoding matrix is a non-coherent capability precoding matrix, a quantity of transport layers is 1, and the corresponding first thresholds is 3 dBm. Likewise, a case in which N=1, M=2, and the first threshold is equal to 3 dB may also be specifically the following scenario: M=2, a precoding matrix is a non-coherent capability precoding matrix, a quantity of transport layers is 1, and the corresponding first threshold is 3 dBm. The terminal device may store the foregoing association relationship, and may determine the first threshold through querying in a determining case.

In an embodiment, the terminal device may store the foregoing association relationship with the first threshold, determine the first threshold based on the stored association relationship, and further determine whether the power headroom satisfies the first condition (for example, whether the power headroom satisfies the threshold relationship). Herein, this embodiment may be used as a separate embodiment, or may be combined with another embodiment. Other similar tables in this application may also appear in this form.

It should be noted that, in this embodiment of this application, a power unit may be dBm or dB. During specific implementation, the unit may alternatively be another quantized value, level, or parameter value. This is not limited in this embodiment of this application.

In a transmit power increasing manner (that is, $p_r>(N/M)\times p_p$), to better improve data transmission reliability, in a possible implementation, the actual transmit power is equal to the channel transmit power.

In this case, if the power headroom satisfies the first condition, the terminal device does not perform a power scaling operation, the actual transmit power is equal to the channel transmit power, and the uplink data is sent at the channel transmit power. If the power headroom does not satisfy the first condition, the terminal device performs a power scaling operation, so that a power obtained after the channel transmit power is scaled is the actual transmit power, and the actual transmit power is $p_r=(N/M)\times p_p$.

The following describes a transmit power on each of the N antenna ports when the actual transmit power is equal to the channel transmit power, and also describes an amplitude quantized value of an associated precoding matrix.

The transmit power on each antenna port varies with a value of N, and the transmit power on each antenna port is specifically as follows:

When N=1, a transmit power on the one antenna port is $p_0=p_p$; or when N=2, a transmit power on one of the two antenna ports is $p_0=0.5p_p$.

A transmit power on one of the N antenna ports satisfies the foregoing condition, and the transmit power on each of the N antenna ports also satisfies the foregoing condition.

The foregoing describes a relationship between an actual transmit power and a precoding matrix. A transmit power on one antenna port is $p_0=(\lambda^2 \times l)\times p_p$, where $\lambda$ indicates an amplitude quantized value, and $l$ indicates a quantity of transport layers occupied on the one antenna port or a quantity of transport layers at which a same antenna port is used to send data. Therefore, if N=1, $\lambda^2 \times l=1$; or if N=2, $$\lambda^2 \times l = \left(\frac{1}{\sqrt{2}}\right)^2 = 0.5.$$

The following indicates an amplitude quantized value of a precoding matrix corresponding to an actual transmit power based on different scenarios corresponding to different values of N.

A case in which N=1 may be specifically the following scenario: A precoding matrix is a non-coherent capability precoding matrix, a quantity of transport layers is 1, and M is not limited. In this scenario, l=1, and therefore an amplitude quantized value is λ=1. A transmit power on one antenna port is the channel transmit power.

A case in which N=2 may be specifically the following two scenarios: a scenario in which M=4, a precoding matrix is a non-coherent capability precoding matrix, and a quantity of transport layers is 2, or a scenario in which M=4, a precoding matrix is a partial-coherent capability precoding matrix, and a quantity of transport layers is 1. In the two scenarios, l=1, and therefore an amplitude quantized value is $$\lambda = \frac{1}{\sqrt{2}}.$$

For ease of understanding, Table 5 describes a power headroom and an amplitude quantized value of a precoding matrix in different scenarios when the actual transmit power is the channel transmit power.

TABLE 5

| | 4 antenna ports | | | | | | 2 antenna ports | | |
| --- | --- | --- | --- | --- | --- | --- | --- | --- | --- |
| | One transport layer | | | Two transport layers | | | One transport layer | | |
| | PH | λ | N | PH | λ | N | PH | λ | N |
| Non-coherent capability | 6 dBm | 1 | 1 | 3 dBm | $\frac{1}{\sqrt{2}}$ | 2 | 3 dBm | 1 | 1 |
| Partial-coherent capability | 3 dBm | $\frac{1}{\sqrt{2}}$ | 2 | | | | | | |

Herein, it should be noted that, in the prior art, the terminal device determines a precoding matrix based on a TPMI that is sent by the network device and that is used to indicate the precoding matrix, and precodes the first uplink data by using the precoding matrix. In addition, an amplitude quantized value of the precoding matrix may indicate that the actual transmit power for the first uplink data is equal to $(N/M) \times p_p$. However, because a relationship between an amplitude quantized value and an actual transmit power remains unchanged, if the terminal device determines, based on the transmission parameter, that the transmit power needs to be increased, and if the amplitude quantized value of the precoding matrix in the prior art does not match a power allocation relationship between ports, it may be stipulated that the terminal device precodes the first uplink data by using a precoding matrix with an adjusted amplitude quantized value. For example, in Table 4, when M=4, there is one transport layer, and a precoding matrix is a non-coherent capability precoding matrix, an amplitude quantized value is λ=1, but the amplitude quantized value in the prior art is λ=½ (the precoding matrix indicated by the TPMI index value 0 in Table 2).

In a possible implementation, the actual transmit power may be further determined based on a value range of the power headroom, and the precoding matrix corresponds to different amplitude quantized values. A precoding matrix with four antenna ports and one transport layer is used as an example. Table 6 describes a manner of determining the actual transmit power based on the value range of the PH.

If the value range of the PH is [0, 3) dBm, N=1. In this case, the transmit power on each antenna port is $p_0=p_p$. In Table 5, when N=1, it specifically indicates that a precoding matrix is a non-coherent capability precoding matrix, that is, the precoding matrix indicated by each of the TPMI index values 0 to 3, and an amplitude quantized value of each precoding matrix is increased to 1.

If the value range of the PH is (3-6] dBm, N=1. In this case, if a precoding matrix is the precoding matrix indicated by each of the TPMI index values 0 and 2, the transmit power on each antenna port is $p_0=p_p$, and an amplitude quantized value of each precoding matrix is increased from ½ to 1. If a precoding matrix is the precoding matrix indicated by each of the TPMI index values 1 and 3, the transmit power on each antenna port is $p_0=(¼) \times p_p$ (that is, the actual transmit power in the prior art), and an amplitude quantized value of each precoding matrix remains unchanged and is ½.

The TPMI index values 0 and 2 are grouped into one group and the TPMI index values 1 and 3 are grouped into another group because of the following reason: A channel correlation between antenna ports corresponding to the TPMI index values 0 and 2 is relatively high, a channel correlation between antenna ports corresponding to the TPMI index values 1 and 3 is relatively high, and a channel correlation between antenna port groups is relatively low.

TABLE 6

| TPMI index | W |
| --- | --- |
| 0-7 | $\begin{bmatrix}1\\0\\0\\0\end{bmatrix}$ $\frac{1}{2}\begin{bmatrix}0\\1\\0\\0\end{bmatrix}$ $\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |

Therefore, according to the data transmission method provided in this embodiment of this application, when the power headroom that can indicate the location of the terminal device satisfies the first condition, the actual transmit power is increased, so that the terminal device located at the cell edge can send the uplink data at a relatively high transmit power, thereby improving data transmission reliability. In addition, when the power headroom that can indicate the location of the terminal device does not satisfy the first condition, the uplink data is sent at a scaled channel transmit power. For the terminal device located at the non-cell edge, this helps reduce interference caused by data transmission, and also helps reduce power consumption of the terminal device.

Case 2

The actual transmit power is determined based on the channel transmit power and the waveform.

In this case, if the waveform is a DFT-s-OFDM waveform, the determined actual transmit power is $p_t > (N/M) \times p_p$;

or if the waveform is another waveform (for example, a CP-OFDM waveform), the determined actual transmit power is $p_r=(N/M)\times p_p$. Similar to Case 1, this may also be a judging or determining process herein.

Generally, if the DFT-s-OFDM waveform is used, it indicates that there is a high probability that the terminal device is located at the cell edge or the terminal device is in a power-limited state (in other words, transmission performance is improved with a power increase). In this case, the transmit power needs to be increased, and the actual transmit power is $p_r>(N/M)\times p_p$. If the another waveform (for example, the CP-OFDM waveform) is used, it indicates that there is a high probability that the terminal device is located in the cell center or the terminal device is not in a power-limited state. In this case, the transmit power does not need to be increased, and the actual transmit power is $p_r=(N/M)\times p_p$. This saves the transmit power of the terminal device, and also avoids uplink interference caused by an unnecessary power increase.

For a manner in which the terminal device obtains the waveform, the network device may indicate, by using higher layer signaling or DCI signaling, the waveform used to send the first uplink data, and the terminal device may directly determine, based on information indicating the waveform, the actual transmit power used to send the first uplink data.

In a transmit power increasing manner (that is, $p_r>(N/M)\times p_p$), to better improve data transmission reliability, in a possible implementation, the actual transmit power is equal to the channel transmit power.

In this case, if the waveform is the DFT-s-OFDM, the terminal device does not perform a power scaling operation, the actual transmit power is equal to the channel transmit power, and the uplink data is sent at the channel transmit power. If the waveform is the another waveform (for example, the CP-OFDM waveform), the terminal device performs a power scaling operation, to obtain a power after the channel transmit power is scaled, that is, the actual transmit power, and the actual transmit power is $p_r=(N/M)\times p_p$.

The following describes a transmit power on each of the N antenna ports when the actual transmit power is equal to the channel transmit power, and also describes an amplitude quantized value of an associated precoding matrix.

The transmit power on each antenna port varies with a value of N, and the transmit power on each antenna port is specifically as follows:

When N=1, a transmit power on the one antenna port is $p_0=p_p$; or
when N=2, a transmit power on one of the two antenna ports is $p_0=0.5p_p$.

A transmit power on one of the N antenna ports satisfies the foregoing condition, and the transmit power on each of the N antenna ports also satisfies the foregoing condition.

Likewise, for a scenario to which that N=1 is applicable and a scenario to which that N=2 is applicable, refer to the foregoing scenario to which that N=1 is applicable and the foregoing scenario to which that N=2 is applicable in Case 1. In addition, for a case in which an amplitude quantized value of a precoding matrix used to precode the first uplink data is =1 when N=1, refer to the related descriptions in Case 1. For a case in which an amplitude quantized value of a precoding matrix used to precode the first uplink data is $$\lambda = \frac{1}{\sqrt{2}}$$

when N=2, refer to the related descriptions in Case 1. For brevity, details are not described herein again.

Herein, it should be noted that, when the transmission parameter includes the waveform, generally, the DFT-s-OFDM waveform is used for one-layer transmission. Therefore, a case in which N=2 is applicable to a scenario in which M=4, a precoding matrix is a partial-coherent capability precoding matrix, and a quantity of transport layers is 1.

However, for ease of understanding, Table 7 describes a wavelength and an amplitude quantized value of a precoding matrix in different scenarios when the actual transmit power is the channel transmit power.

TABLE 7

| | 4 antenna ports One transport layer | | | 2 antenna ports One transport layer | |
|---|---|---|---|---|---|
| | Waveform | λ | N | Waveform | λ N |
| Non-coherent capability | DFT-s-OFDM waveform | 1 | 1 | DFT-S-OFDM waveform | 1  1 |
| Partial-coherent capability | DFT-S-OFDM waveform | $\frac{1}{\sqrt{2}}$ | 2 | | |

According to the data transmission method provided in this embodiment of this application, when the waveform that can indicate the location of the terminal device is the DFT-s-OFDM waveform, the actual transmit power is increased, so that the terminal device located at the cell edge can send the uplink data at a relatively high transmit power, thereby improving data transmission reliability. In addition, when the waveform that can indicate the location of the terminal device is the CP-OFDM waveform, the uplink data is sent at a scaled channel transmit power. For the terminal device located at the non-cell edge, this helps reduce interference caused by data transmission, and also helps reduce power consumption of the terminal device.

Case 3

The actual transmit power is determined based on the channel transmit power and the DCI format.

In this case, if the DCI format is a first DCI format, the determined actual transmit power is $p_r>(N/M)\times p_p$. The first DCI may also be referred to as the foregoing compact DCI format, and the compact DCI format may be the DCI format 0_0. If the DCI format is a second DCI format (for example, the DCI format 01), the determined actual transmit power is $p_r=(N/M)\times p_p$, in other words, the actual transmit power is determined based on the prior art. Similar to Case 1 and Case 2, this may also be a judging or determining process herein.

Generally, the DCI format detected by the terminal device is sent by the network device to the terminal device based on whether the terminal device is located at the cell edge. For example, if the DCI format is the first DCI format (for example, the DCI format 0_0), it indicates that there is a high probability that the terminal device is located at the cell edge or the terminal device is in a power-limited state (in other words, transmission performance is improved with a power increase). In this case, the transmit power needs to be increased, and the actual transmit power is $p_r>(N/M)\times p_p$. If the DCI format is the second DCI format (for example, the DCI format 0_1), it indicates that there is a high probability that the terminal device is located in the cell center or the terminal device is not in a power-limited state. In this case, the transmit power does not need to be increased, and the actual transmit power is $p_t=(N/M) \times p_p$. This saves the transmit power of the terminal device, and also avoids uplink interference caused by an unnecessary power increase.

For a manner in which the terminal device obtains the DCI format, the network device indicates a control information configuration parameter by using higher layer signaling. The control information configuration parameter includes a time-frequency code resource carrying DCI signaling, and a method in which the terminal device detects the DCI. The detection method includes a detection period, a quantity of detection times, a DCI format that needs to be detected, and the like. For a piece of DCI signaling, the network device may configure a plurality of DCI formats that need to be detected. The terminal device needs to try the plurality of DCI formats at each DCI detection moment, and determines, through blind detection (Blind Detection), a DCI format currently used by the DCI signaling.

In a transmit power increasing manner (that is, $p_t > (N/M) \times p_p$), to better improve data transmission reliability, in a possible implementation, the actual transmit power is equal to the channel transmit power.

In this case, if the DCI format is the first DCI format (for example, the DCI format 0_0), the terminal device does not perform a power scaling operation, the actual transmit power is equal to the channel transmit power, and the uplink data is sent at the channel transmit power. If the DCI format is the second DCI format (for example, the DCI format 0_1), the terminal device performs a power scaling operation, so that a power obtained after the channel transmit power is scaled is the actual transmit power, and the actual transmit power is $p_t=(N/M) \times p_p$.

The following describes a transmit power on each of the N antenna ports when the actual transmit power is equal to the channel transmit power, and also describes an amplitude quantized value of an associated precoding matrix.

The transmit power on each antenna port varies with a value of N, and the transmit power on each antenna port is specifically as follows:

When N=1, a transmit power on the one antenna port is $p_0=p_p$; or when N=2, a transmit power on one of the two antenna ports is $p_0=0.5p_p$.

A transmit power on one of the N antenna ports satisfies the foregoing condition, and the transmit power on each of the N antenna ports also satisfies the foregoing condition.

Likewise, for a scenario to which that N=1 is applicable and a scenario to which that N=2 is applicable, refer to the foregoing scenario to which that N=1 is applicable and the foregoing scenario to which that N=2 is applicable in Case 1. In addition, for a case in which an amplitude quantized value of a precoding matrix used to precode the first uplink data is $\lambda=1$ when N=1, refer to the related descriptions in Case 1. For a case in which an amplitude quantized value of a precoding matrix used to precode the first uplink data is $$\lambda = \frac{1}{\sqrt{2}}$$

when N=2, refer to the related descriptions in Case 1. For brevity, details are not described herein again.

Herein, it should be noted that, when the transmission parameter includes a parameter used to indicate the DCI format, a case in which N=2 is applicable to a scenario in which M=4, a precoding matrix is a partial-coherent capability precoding matrix, and a quantity of transport layers is 1.

However, for ease of understanding, Table 8 describes a DCI format and an amplitude quantized value of a precoding matrix in different scenarios when the actual transmit power is the channel transmit power.

TABLE 8

| | 4 antenna ports One transport layer | | 2 antenna ports One transport layer | |
| --- | --- | --- | --- | --- |
| | DCI format | $\lambda$ N | Waveform | $\lambda$ N |
| Non-coherent capability | DCI format 0_0 | 1  1 | DCI format 0_0 | 1  1 |
| Partial-coherent capability | DCI format 0_0 | $\frac{1}{\sqrt{2}}$  2 | | |

According to the data transmission method provided in this embodiment of this application, when the DCI format that can indicate the location of the terminal device is a DCI format including a smallest quantity of bits (for example, the first DCI format) in a plurality of DCI formats used to schedule the uplink data, actual transmit power is increased, so that the terminal device located at the cell edge can send the uplink data at a relatively high transmit power, thereby improving data transmission reliability. In addition, when the DCI format that can indicate the location of the terminal device is not the first DCI format, the uplink data is sent at a scaled channel transmit power. For the terminal device located at the non-cell edge, this helps reduce interference caused by data transmission, and also helps reduce power consumption of the terminal device.

Case 4

The actual transmit power is determined based on the channel transmit power and the MCS.

In this case, if a modulation scheme of the MCS is BPSK or QPSK, the determined actual transmit power is $p_t > (N/M) \times p_p$; or if a modulation scheme of the MCS is another modulation scheme (for example, 16QAM or 64QAM), the determined actual transmit power is $p_t=(N/M) \times p_p$, in other words, the actual transmit power is determined based on the prior art. Similar to Case 1 to Case 3, this may also be a judging or determining process herein.

Generally, a low modulation order in the modulation scheme of the MCS such as BPSK or QPSK indicates poor channel quality, and therefore indicates that there is a high possibility that the terminal device is located at the cell edge or the terminal device is in a power-limited state. In this case, the transmit power needs to be increased, and the actual transmit power is $p_t > (N/M) \times p_p$. A high modulation order in the modulation scheme of the MCS such as 16QAM or 64QAM indicates good channel quality, and therefore indicates that there is a high probability that the terminal device is located in the cell center or the terminal device is not in a power-limited state. In this case, the transmit power does not need to be increased, and the actual transmit power is $p_t=(N/M) \times p_p$. This saves the transmit power of the terminal device, and also avoids uplink interference caused by an unnecessary power increase.

For a manner in which the terminal device obtains the MCS, the network device may indicate, by using DCI, the MCS used by the terminal device to send the first uplink data. Specifically, the network device may indicate, by using an index value of the MCS, the MCS used to send the first uplink data. The terminal device may determine a coding and modulation scheme of the first uplink data by using the MCS, and determine the actual transmit power used to send the first uplink data. For example, Table 9 shows an MCS field in the DFT-s-OFDM waveform. An example in which a modulation order of the MCS is 4 is used. If the modulation order of the MCS is 4, any one of index values 10 to 16 may be used to indicate the MCS used to send the first uplink data.

TABLE 9

| MCS index value IMCS | Modulation order Qm | Target bit rate Rx 1024 | Spectrum efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

In a transmit power increasing manner (that is, $p_t > (N/M) \times p_p$), to better improve data transmission reliability, in a possible implementation, the actual transmit power is equal to the channel transmit power.

In this case, if the modulation scheme of the MCS is BPSK or QPSK, the terminal device does not perform a power scaling operation, the actual transmit power is equal to the channel transmit power, and the uplink data is sent at the channel transmit power. If the modulation scheme of the MCS is another modulation scheme (for example, 16QAM or 64QAM), the terminal device performs a power scaling operation, so that a power obtained after the channel transmit power is scaled is the actual transmit power, and the actual transmit power is $p_t = (N/M) \times p_p$.

The following describes a transmit power on each of the N antenna ports when the actual transmit power is equal to the channel transmit power, and also describes an amplitude quantized value of an associated precoding matrix.

The transmit power on each antenna port varies with a value of N, and the transmit power on each antenna port is specifically as follows:

When N=1, a transmit power on the one antenna port is $p_0 = p_p$; or when N=2, a transmit power on one of the two antenna ports is $p_0 = 0.5 p_p$.

A transmit power on one of the N antenna ports satisfies the foregoing condition, and the transmit power on each of the N antenna ports also satisfies the foregoing condition.

Likewise, for a scenario to which that N=1 is applicable and a scenario to which that N=2 is applicable, refer to the foregoing scenario to which that N=1 is applicable and the foregoing scenario to which that N=2 is applicable in Case 1. In addition, for a case in which an amplitude quantized value of a precoding matrix used to precode the first uplink data is λ=1 when N=1, refer to the related descriptions in Case 1. For a case in which an amplitude quantized value of a precoding matrix used to precode the first uplink data $$\lambda = \frac{1}{\sqrt{2}}$$

when N=2, refer to the related descriptions in Case 1. For brevity, details are not described herein again.

Herein, it should be noted that, when the transmission parameter includes the MCS, a case in which N=2 is applicable to a scenario in which M=4, a precoding matrix is a partial-coherent capability precoding matrix, and a quantity of transport layers is 1.

However, for ease of understanding, Table 10 describes a MCS modulation scheme and an amplitude quantized value of a precoding matrix in different scenarios when the actual transmit power is the channel transmit power.

TABLE 10

| | 4 antenna ports One transport layer | | 2 antenna ports One transport layer | |
|---|---|---|---|---|
| | Modulation scheme | λ N | Modulation scheme | λ N |
| Non-coherent capability | BPSK or QPSK | 1 1 | BPSK or QPSK | 1 1 |

According to the data transmission method provided in this embodiment of this application, when the modulation scheme of the MCS that can indicate the location of the terminal device is BPSK or QPSK, actual transmit power is increased, so that the terminal device located at the cell edge can send the uplink data at a relatively high transmit power, thereby improving data transmission reliability. In addition, when the modulation scheme of the MCS that can indicate the location of the terminal device is 16 quadrature amplitude modulation QAM, 64QAM, or a higher order modulation scheme, the uplink data is sent at a scaled channel transmit power. For the terminal device located at the non-cell edge, this helps reduce interference caused by data transmission, and also helps reduce power consumption of the terminal device.

Case 5

The actual transmit power is determined based on the channel transmit power and the power adjustment value.

In this case, if power adjustment values obtained by the terminal device for K times each satisfy a second condition, the determined actual transmit power is $p_t > (N/M) \times p_p$; otherwise, the determined actual transmit power is $p_t = (N/M) \times p_p$. The second condition is used to determine that the terminal device is located at the cell edge. Similar to Case 1 to Case 4, this may also be a judging or determining process herein.

If K=1, a power adjustment value obtained this time is a power adjustment value for the first uplink data. If K>1, a power adjustment value obtained for the last time in the power adjustment values obtained for K times is a power adjustment value for the first uplink data.

For example, the power adjustment value may be indicated by using a TPC field in DCI. If K=1, the power adjustment value is a power adjustment value indicated by the TPC field in the DCI used to schedule the first uplink data. If K>1, DCI obtained last time in DCI obtained for K times is the power adjustment value for the first uplink data. Naturally, a power adjustment value indicated by a TPC field in the DCI obtained last time is also for the first uplink data. Herein, for the TPC field in the DCI, refer to the foregoing descriptions about Table 4. For brevity, details are not described herein again.

In a possible implementation, the second condition is that the power adjustment values obtained by the terminal device for K times each are greater than or equal to a second threshold.

Generally, a large power adjustment value indicates poor channel quality, and therefore indicates that there is a high probability that the terminal device is located at the cell edge. In this case, the transmit power needs to be increased, and the actual transmit power is $p_t>(N/M)\times p_p$. A small power adjustment value indicates good channel quality, and therefore indicates that there is a high probability that the terminal device is located in the cell center. In this case, the transmit power does not need to be increased, and the actual transmit power is $p_t=(N/M)\times p_p$. This saves the transmit power of the terminal device, and also avoids uplink interference caused by an unnecessary power increase.

If the second condition is that the power adjustment value obtained by the terminal device for K times is greater than or equal to the second threshold, the second threshold is equal to 3 dBm, and K is an integer greater than or equal to 1. Herein, 3 dBm means a cumulative value of the power adjustment value. By way of example and not limitation, the second threshold may alternatively be 4 dBm, where 3 dBm herein means an absolute value of the power adjustment value.

It should be understood that, when K>1, the power adjustment values obtained for K times may be the same, or may be different, provided that the power adjustment values each are greater than or equal to the second threshold. For example, if the second threshold is equal to 3 dBm, and K=2, a power adjustment value obtained for the first time is 2 dBm, and a power adjustment value obtained for the second time is 3 dBm.

In a possible implementation, the second condition is specifically that power adjustment values obtained by the terminal device for K consecutive times each are equal to the second threshold.

During actual implementation, it is considered from an actual situation that, when K=2, in other words, if power adjustment values obtained for two consecutive times each are greater than the second threshold, it indicates that the terminal device is located at the cell edge, and the transmit power needs to be increased.

In a transmit power increasing manner (that is, $p_t>(N/M)\times p_p$), to better improve data transmission reliability, in a possible implementation, the actual transmit power is equal to the channel transmit power.

In this case, if the power adjustment values obtained for K times each satisfy the second condition, the terminal device does not perform a power scaling operation, the actual transmit power is equal to the channel transmit power, and the uplink data is sent at the channel transmit power. If the power adjustment values obtained for K times each do not satisfy the second condition, the terminal device performs a power scaling operation, a power obtained after the channel transmit power is scaled is the actual transmit power, and the actual transmit power is $p_t=(N/M)\times p_p$.

The following describes a transmit power on each of the N antenna ports when the actual transmit power is equal to the channel transmit power, and also describes an amplitude quantized value of an associated precoding matrix.

The transmit power on each antenna port varies with a value of N, and the transmit power on each antenna port is specifically as follows:

When N=1, a transmit power on the one antenna port is $p_0=p_p$; or when N=2, a transmit power on one of the two antenna ports is $p_0=0.5p_p$.

A transmit power on one of the N antenna ports satisfies the foregoing condition, and the transmit power on each of the N antenna ports also satisfies the foregoing condition.

Likewise, for a scenario to which that N=1 is applicable and a scenario to which that N=2 is applicable, refer to the foregoing scenario to which that N=1 is applicable and the foregoing scenario to which that N=2 is applicable in Case 1. In addition, for a case in which an amplitude quantized value of a precoding matrix used to precode the first uplink data is =1 when N=1, refer to the related descriptions in Case 1. For a case in which an amplitude quantized value of a precoding matrix used to precode the first uplink data is $$\lambda = \frac{1}{\sqrt{2}}$$

when N=2, refer to the related descriptions in Case 1. For brevity, details are not described herein again.

According to the data transmission method provided in this embodiment of this application, when power adjustment values that are obtained by the terminal device for a plurality of times and that can indicate the location of the terminal device each satisfy the second condition, the actual transmit power is increased, so that the terminal device located at the cell edge can send the uplink data at a relatively high actual transmit power, thereby improving data transmission reliability. In addition, when power adjustment values that are obtained by the terminal device for a plurality of times and that can indicate the location of the terminal device each do not satisfy the second condition, the uplink data is sent at a scaled channel transmit power. For the terminal device located at the non-cell edge, this helps reduce interference caused by data transmission, and also helps reduce power consumption of the terminal device.

The foregoing describes in detail the data transmission method in this embodiment of this application. In addition, an embodiment of this application further provides a data transmission method 200. The method 200 describes the solution from another implementation perspective. Simply, a system or a protocol specifies or a network device preconfigures a precoding matrix corresponding to an increased actual transmit power (that is, the actual transmit power is $p_t>(N/M)\times p_p$, or a transmit power on one antenna port is $p_t=(N/M)\times p_p$), and the network device determines, by using an algorithm of the network device, a precoding matrix used for to-be-sent uplink data of the terminal device, and notifies the terminal device of the precoding matrix by using information. In this way, the terminal device may determine the actual transmit power based on the precoding matrix, so that the actual transmit power is determined based on various transmission parameters without using the method 100.

Figure 4:
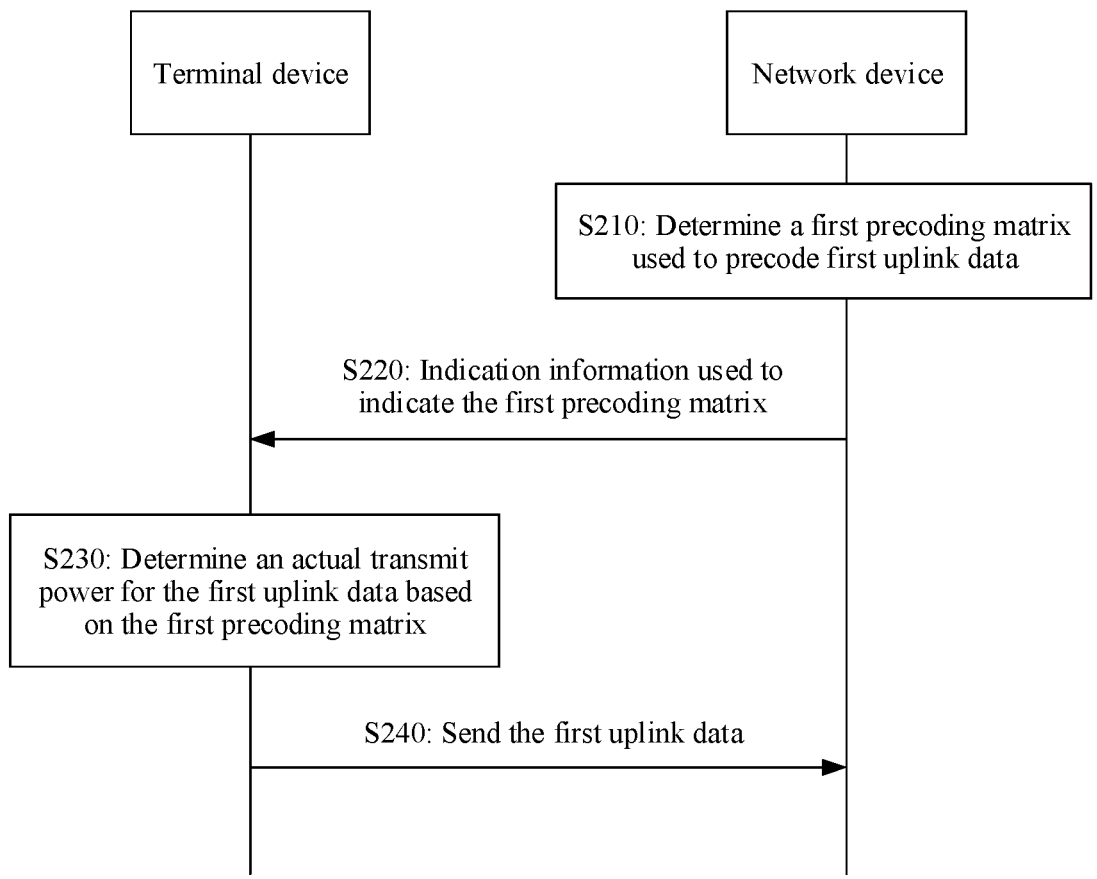
FIG. 4 is another schematic interaction diagram of a data transmission method according to an embodiment of this application.

The following describes in detail the data transmission method 200 in this embodiment of this application with reference to FIG. 4.

In S210, the network device determines a first precoding matrix used to precode first uplink data, where the first precoding matrix belongs to a first precoding matrix subset or a second precoding matrix subset of a precoding matrix set, A transmit power for uplink data that is determined based on each of one or more precoding matrices in the first precoding matrix subset satisfies the following condition: a transmit power on one of antenna ports used to send the uplink data is $p_0 > (1/M) \times p_p$, where a quantity of antenna ports used to send the uplink data is greater than or equal to 1 and less than M; and a transmit power for uplink data that is determined based on each of one or more precoding matrices in the second precoding matrix subset satisfies the following condition: a transmit power on one of the antenna ports used to send the uplink data is $p_0 = (1/M) \times p_p$, where M is a quantity of antenna ports configured by the network device to send the uplink data, $p_p$ is a channel transmit power for the uplink data, and M is an integer greater than 1.

Specifically, the network device may determine, based on current uplink channel quality and another parameter, a time-frequency resource and a transmission scheme that are used by the terminal device to send the first uplink data. The transmission scheme includes a precoding matrix (that is, the first precoding matrix) used to send the first uplink data. In a process of determining the first precoding matrix, the network device may select one precoding matrix from the first precoding matrix subset or the second precoding matrix subset of the precoding matrix set, for precoding the first uplink data by the terminal device.

The following describes in detail the precoding matrix set in this embodiment of this application.

In this embodiment of this application, the one or more precoding matrices in the first precoding subset each correspond to an increased actual transmit power. Specifically, a transmit power on each antenna port in the transmit powers determined based on each of the one or more precoding matrices is $p_0 > (1/M) \times p_p$. One precoding matrix is used as an example. If a quantity of antenna ports that are used to send the uplink data and that correspond to the precoding matrix is N (N is determined by a type of the precoding matrix), an actual transmit power determined based on the precoding matrix is $p_0 > (N/M) \times p_p$. The one or more precoding matrices in the second precoding subset each correspond to a transmit power that is not increased. Specifically, a transmit power on each antenna port in the transmit powers determined based on each of the one or more precoding matrices is $p_0 = (1/M) \times p_p$. Similarly, one precoding matrix is used as an example. If a quantity of antenna ports that are used to send the uplink data and that correspond to the precoding matrix is N, an actual transmit power determined based on the precoding matrix is $p_t = (N/M) \times p_p$.

The precoding set in this embodiment of this application may be specified in a protocol or a system, or may be preconfigured by the network device. A specific implementation is not limited.

An indication of a precoding matrix finally needs to be implemented on a quantity of transport layers (for example, Table 1 to Table 3 each show a precoding set that is specifically implemented based on a quantity of antenna ports and a quantity of transport layers). Therefore, precoding matrices in the precoding set are precoding matrices that are used to send the uplink data and that correspond to a quantity of transport layers less than or equal to L transport layers, one transport layer corresponds to one or more precoding matrices, L is a largest quantity of transport layers that can be supported by the terminal device, and L is an integer greater than or equal to 1. In addition, the precoding matrix set may include a non-coherent capability precoding matrix, or may include a partial-coherent capability precoding matrix and a non-coherent capability precoding matrix, or may include a full-coherent capability precoding matrix, a partial-coherent capability precoding matrix, and a non-coherent capability precoding matrix. One transport layer may correspond to one or more types of precoding matrices in the precoding set, or one or more precoding matrices corresponding to one transport layer may be different types of precoding matrices.

The precoding matrix set in this embodiment of this application may be indicated by using a "precoding information and number of layers" (precoding information and number of layers) field. Table 11 shows a "precoding information and number of layers" field in a case in which there are four antenna ports, a waveform is CP-OFDM, and a maximum quantity of transport layers is 2 and 3. Table 12 shows a "precoding information and number of layers" field in a case in which there are four antenna ports, a waveform is CP-OFDM, and a maximum quantity of transport layers is 1.

It should be understood that a correspondence between a bit field index value and a precoding matrix in Table 11 and Table 12 is merely an example for description, and should not constitute a limitation on this embodiment of this application. A non-coherent capability precoding matrix is used as an example, A bit field index value 11 may also be used to indicate a precoding matrix with one transport layer, and a bit field index value 12 may also be used to indicate a precoding matrix with two transport layers.

During implementation, the network device indicates, based on the maximum quantity L of transport layers that can be supported by the terminal device and a type of a supported precoding matrix, a precoding matrix whose quantity of transport layers is less than or equal to L and that conforms to the type of the precoding matrix to the terminal device by using a bit field index value in a "precoding information and number of layers" field (for example, Table 11 or Table 12) in higher layer signaling. The terminal device determines, based on a TPMI that is of current to-be-sent uplink data and that is sent by the network device by using DCI, a precoding matrix indicated by the TPMI in precoding matrices indicating specific quantities of antenna ports and specific quantities of transport layers (for example, Table 1, Table 2, or Table 3). For example, if the maximum quantity of transport layers that can be supported by the terminal device is 3, and the type of the supported precoding matrix is a non-coherent capability precoding matrix, the network device may indicate a precoding matrix to the terminal device based on a correspondence between a rightmost precoding matrix and a bit field index value in Table 11 by using the "precoding information and number of layers" field. The terminal device also determines, based on a bit value indicated by the field, the precoding matrix based on the correspondence between a rightmost precoding matrix and a bit field index value. For example, when determining a precoding matrix whose bit field index value is 1 and that needs to be used by the terminal device to send the first uplink data, the precoding matrix may be indicated by using the bit field index value 1 carried in the DCI, and the terminal device may determine, in Table 2 based on the bit field index value 1, the precoding matrix indicated by the TPMI that is 1.

TABLE 11

| Bit field index value | Full-coherent + partial-coherent + non-coherent | Bit field index value | partial-coherent + non-coherent | Bit field index value | non-coherent |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer = TPMI = 1 |
| ... | ... | ... | ... | ... | ... |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| ... | ... | ... | ... | ... | ... |
| 9 | Two layers: TPMI = 5 | 0 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Two layers: TPMI = 0 (an amplitude quantized value is 1) | 11 | One layer: TPMI = 0 (an amplitude quantized value is 1) | 11 | Two layers: TPMI = 0 (an amplitude quantized value is 1) |
| 12 | One layer: TPMI = 4 | 12 | One layer: TPMI = 4 | 12 | One layer: TPMI = 0 (an amplitude quantized value is 1) |
|  |  |  |  | 13 | One layer: TPMI = 1 (an amplitude quantized value is 1) |
| ... | ... | ... | ... |  |  |
| 19 | One layer: TPMI = 11 | 19 | One layer: TPMI = 11 | 14 | One layer: TPMI = 2 (an amplitude quantized value is 1) |
| 20 | Two layers: TPMI = 6 | 20 | Two layers: TPMI = 6 | 15 | One layer: TPMI = 3 (an amplitude quantized value is 1) |
| ... | ... | ... | ... |  |  |
| 27 | Two layers: TPMI = 13 | 27 | Two layers: TPMI = 13 |  |  |
| 28 | Three layers: TPMI = 1 | 28 | Three layers: TPMI = 1 |  |  |
| 29 | Three layers: TPMI = 2 | 29 | Three layers: TPMI = 2 |  |  |
| 30 | Two layers: TPMI = 1 (an amplitude quantized value is 1) | 30 | One layer: TPMI = 1 (an amplitude quantized value is 1) |  |  |
| 31 | Two layers: TPMI = 2 (an amplitude quantized value is 1) | 31 | One layer: TPMI = 2 (an amplitude quantized value is 1) |  |  |
| 32 | One layer: TPMI = 12 |  |  |  |  |
| ... | ... |  |  |  |  |
| 47 | One layer: TPMI = 27 |  |  |  |  |
| 48 | Two layers: TPMI = 14 |  |  |  |  |
| ... | ... |  |  |  |  |
| 55 | Two layers: TPMI = 21 |  |  |  |  |
| 56 | Three layers: TPMI = 3 |  |  |  |  |
| ... | ... |  |  |  |  |
| 59 | Three layers: TPMI = 6 |  |  |  |  |
| 60 | One layer: TPMI = 0 (an amplitude quantized value is 1) |  |  |  |  |
| 61 | One layer: TPMI = 1 (an amplitude quantized value is 1) |  |  |  |  |
| 62 | One layer: TPMI = 2 (an amplitude quantized value is 1) |  |  |  |  |
| 63 | One layer: TPMI = 3 (an amplitude quantized value is 1) |  |  |  |  |

TABLE 12

| Bit field index value | Partial-coherent + non-coherent |
|---|---|
| 0 | One layer: TPMI = 0 |
| 1 | One layer: TPMI = 1 |
| ... | ... |
| 3 | One layer: TPMI = 3 |
| 4 | One layer: TPMI = 4 |
| ... | ... |
| 11 | One layer: TPMI = 11 |
| 12 | One layer: TPMI = 0 (an amplitude quantized value is 1) |
| 13 | One layer: TPMI = 1 (an amplitude quantized value is 1) |
| 14 | One layer: TPMI = 2 (an amplitude quantized value is 1) |
| 15 | One layer: TPMI = 3 (an amplitude quantized value is 1) |

The first precoding subset and the second precoding subset in the precoding matrix set are described based on Table 11 and Table 12.

In Table 11, the first precoding subset and the second precoding subset are described by using an example in which the maximum quantity L of transport layers is 3.

If the precoding matrix set includes a non-coherent capability precoding matrix, the bit field index values 11 to 15 are used to indicate non-coherent capability precoding matrices in the first precoding subset, the quantity of transport layers is 1 or 2, and the remaining bit field index values are used to indicate non-coherent capability precoding matrices in the second precoding subset. If the precoding matrix set includes a partial-coherent capability precoding matrix and a non-coherent capability precoding matrix, the bit field index values 11, 30, and 31 are used to indicate non-coherent capability precoding matrices in the first precoding subset, the quantity of transport layers is 1, and the remaining bit field index values are used to indicate partial-coherent or non-coherent capability precoding matrices in the second precoding subset. If the precoding matrix set includes a full-coherent precoding matrix, a partial-coherent capability precoding matrix, and a non-coherent capability precoding matrix, the bit field index values 11, 30, 31, and 60 to 63 are used to indicate non-coherent capability precoding matrices in the first precoding subset, the quantity of transport layers is 1 or 2, and the remaining bit field index values are used to indicate precoding matrices in the second precoding subset.

In Table 12, the maximum quantity L of transport layers is 1, and the precoding matrix set includes a partial-coherent capability precoding matrix and a non-coherent capability precoding matrix. Precoding matrices indicated by the bit field index values 12 to 15 are non-coherent capability precoding matrices in the first precoding subset, the quantity of transport layers is 1, and precoding matrices indicated by the remaining bit field index values are precoding matrices in the second precoding subset.

It should be noted that the first precoding matrix subset is added to the precoding matrix set in this embodiment of this application, and a corresponding precoding matrix may be accordingly added or not added to a codebook including a precoding matrix with a specific quantity of antenna ports and a specific quantity of transport layers. When a precoding matrix corresponding to the first precoding subset is not added to the codebook, for example, a precoding matrix whose amplitude quantized value corresponding to "TPMI=0" is 1 and that is indicated by the bit field index value 12 in Table 12, the terminal device may determine, as an actually used precoding matrix, a precoding matrix obtained after the amplitude quantized value corresponding to "TPMI=0" in Table 2 is changed to 1. When a precoding matrix corresponding to the first precoding subset is added to the codebook, another bit value may be used as a TPMI index value of the precoding matrix. Similarly, Table 12 is used as an example. The bit field index value 12 may correspond to a precoding matrix with one layer and "TPMI=0" (an amplitude quantized value is 1), and "TPMI=12" is added to Table 2. In Table 2, a phase of a precoding matrix indicated by "TPMI=12" is the same as a phase of a precoding matrix indicated by "TPMI=0", and only amplitude quantized values are different.

In a transmit power increasing manner, to better improve data transmission performance, in a possible implementation, the actual transmit power determined based on each of the one or more precoding matrices in the first precoding matrix subset is equal to the channel transmit power for the uplink data.

The following describes, for a case in which the actual transmit power determined based on each of the one or more precoding matrices in the first precoding subset is equal to the channel transmit power, a transmit power on each of antenna ports used to send the uplink data. In addition, an amplitude quantized value of an associated precoding matrix is described.

The transmit power determined based on each of the one or more precoding matrices in the first precoding matrix subset specifically satisfies the following condition:

When the quantity of antenna ports used to send the uplink data is equal to 1, a transmit power on the one antenna port is $p_0=p_p$; or when the quantity of antenna ports used to send the uplink data is equal to 2, a transmit power on one of the two antenna ports is $p_0=0.5p_p$.

It should be understood that a transmit power on one antenna port satisfies the foregoing condition, and the transmit power on each of the antenna ports used to send the uplink data also satisfies the foregoing condition.

The foregoing describes a relationship between an actual transmit power and a precoding matrix. A transmit power on one antenna port is $p_0=(\lambda^2 \times l) \times p_p$, where $\lambda$ indicates an amplitude quantized value, and l indicates a quantity of transport layers occupied on the one antenna port or a quantity of transport layers at which a same antenna port is used to send data. Therefore, if the quantity of antenna ports used to send the uplink data is 1, $\lambda^2 \times l = 1$; or if the quantity of antenna ports used to send the uplink data is 2, $$\lambda^2 \times l = \left(\frac{1}{\sqrt{2}}\right)^2 = 0.5.$$

The following describes an amplitude quantized value of a precoding matrix corresponding to an actual transmit power based on different scenarios corresponding to different values of the quantity of antenna ports used to send the uplink data.

A case in which the quantity of antenna ports used to send the uplink data is equal to 1 may be specifically the following scenario: A precoding matrix is a non-coherent capability precoding matrix, a quantity of transport layers is 1, and M is not limited. In this scenario, l=1, and therefore an amplitude quantized value is $\lambda=1$. A transmit power on one antenna port is the channel transmit power.

A case in which the quantity of antenna ports used to send the uplink data is equal to 2 may be specifically the following two scenarios: a scenario in which M=4, a precoding matrix is a non-coherent capability precoding matrix, and a quantity of transport layers is 2, or a scenario in which M=4, a precoding matrix is a partial-coherent capability precoding matrix, and a quantity of transport layers is 1. In the two scenarios, l=1, and therefore an amplitude quantized value is $$\lambda = \frac{1}{\sqrt{2}}.$$

It can be learned from the foregoing analysis that the first precoding subset in this embodiment of this application may alternatively be described from the perspective of a precoding matrix.

Each precoding matrix in the first precoding matrix subset satisfies the following condition:

When the quantity of antenna ports used to send the uplink data is equal to 1, an amplitude quantized value of each precoding matrix in the first precoding matrix subset is 1; or when the quantity of antenna ports used to send the uplink data is equal to 2, an amplitude quantized value of each precoding matrix in the first precoding matrix subset is $$\frac{1}{\sqrt{2}}.$$

The following describes the first precoding subset included in Table 11 and Table 12 that corresponds to the foregoing two amplitude quantized values.

First, in Table 11, the first precoding subset is described by using an example in which the maximum quantity L of transport layers is equal to 3.

If the precoding matrix set includes a non-coherent capability precoding matrix, the bit index values 12 to 15 are used to indicate non-coherent capability precoding matrices whose amplitude quantized values each are 1, and the quantity of transport layers is 1; and the bit index value 11 is used to indicate a non-coherent capability precoding matrix whose amplitude quantized value is $$\frac{1}{\sqrt{2}},$$

and the quantity of transport layers is 2. If the precoding matrix set includes a partial-coherent capability precoding matrix and a non-coherent capability precoding matrix, the bit field index values 11, 30, and 31 are used to indicate non-coherent capability precoding matrices whose amplitude quantized values each are 1, and the quantity of transport layers is 1. If the precoding matrix set includes a full-coherent capability precoding matrix, a partial-coherent capability precoding matrix, and a non-coherent capability precoding matrix, the bit field index values 11, 30, and 31 are used to indicate non-coherent capability precoding matrices whose amplitude quantized values each are $$1/\sqrt{2},$$

and the quantity of transport layers is 2; and the bit index values 60 to 63 are used to indicate non-coherent capability precoding matrices whose amplitude quantized values each are 1, and the quantity of transport layers is 1.

In Table 12, the bit field index values 12 to 15 are used to indicate non-coherent capability precoding matrices whose amplitude quantized values each are 1.

As described above, a precoding matrix includes a phase and an amplitude quantized value. In a possible implementation of this embodiment of this application, a phase of each of the one or more precoding matrices in the first precoding matrix subset is a phase of a precoding matrix included in the second precoding matrix subset.

Two precoding matrices with a same phase in the two subsets are of a same type.

For example, in Table 12, four precoding matrices in the first precoding subset are all non-coherent capability precoding matrices with one transport layer, and phases of the four precoding matrices are phases of precoding matrices in the second precoding matrix subset that are indicated by the bit field index values 0 to 11. Specifically, a phase of the precoding matrix whose TPMI is 0 and that is indicated by the bit field index value 0 is the same as a phase of the precoding matrix whose TPMI is 0 and that is indicated by the bit field index value 12, a phase of the precoding matrix whose TPMI is 1 and that is indicated by the bit field index value 1 is the same as a phase of the precoding matrix whose TPMI is 1 and that is indicated by the bit field index value 13, a phase of the precoding matrix whose TPMI is 2 and that is indicated by the bit field index value 2 is the same as a phase of the precoding matrix whose TPMI is 2 and that is indicated by the bit field index value 14, and a phase of the precoding matrix whose TPMI is 3 and that is indicated by the bit field index value 3 is the same as a phase of the precoding matrix whose TPMI is 3 and that is indicated by the bit field index value 15.

A precoding matrix is indicated by using a bit field index value. Therefore, during implementation, a quantity of occupied bits is determined based on a quantity of precoding matrices included in the precoding matrix set. For example, if the quantity of bits is N, the N bits may indicate $2^n$ precoding matrices. However, actually, there may be some remaining bit values. Because the phase of the precoding matrix in the first precoding matrix subset is the phase of the precoding matrix in the second precoding subset, it means that the first precoding subset includes fewer precoding matrices. Therefore, the precoding matrix in the first precoding subset may be indicated by using a remaining bit value in the precoding matrix set, so that a precoding matrix with an adjusted amplitude quantized value can be indicated by using a reserved field, without changing a quantity of existing bits and without affecting flexibility of selecting an existing codeword.

An example in which the maximum quantity L of transport layers is 3 and a precoding matrix is a non-coherent capability precoding matrix in Table 11 is used. In the prior art, the bit field index values 0 to 11 indicate precoding matrices in the second precoding matrix subset, the bit field index value 11 indicates a precoding matrix corresponding to four-layer transmission, and the bit field index values 12 to 15 are all remaining bit values. If L=3, the precoding matrix corresponding to four-layer transmission is deleted, the bit field index value 11 is used to indicate a precoding matrix corresponding to two-layer transmission in the first precoding subset, and the remaining bit field index values 12 to 15 are used to indicate precoding matrices corresponding to one-layer transmission in the first precoding subset.

In S220, the network device sends, to the terminal device, indication information used to indicate the first precoding matrix. The indication information is the TPMI described above.

In S230, the terminal device determines the actual transmit power for the first uplink data based on the first precoding matrix and the channel transmit power for the first uplink data.

In other words, the terminal device determines the actual transmit power based on the amplitude quantized value of the precoding matrix and the channel transmit power by using the relationship between an amplitude quantized value of a precoding matrix and an actual transmit power. For specific descriptions of determining the actual transmit power, refer to the foregoing related descriptions. For brevity, details are not described herein again.

In S240, the terminal device sends the first uplink data at the actual transmit power.

Therefore, according to the data transmission method in this embodiment of this application, the first precoding subset and the second precoding subset are set in the precoding set; a transmit power for uplink data that is determined based on a precoding matrix in the first precoding matrix subset satisfies the following condition: a transmit power on one of the antenna ports used to send the uplink data is $p_0=(1/M) \times p_p$, where the quantity of antenna ports used to send the uplink data is greater than or equal to 1 and less than M; and a transmit power for uplink data that is determined based on a precoding matrix in the second precoding matrix subset satisfies the following condition: a transmit power on one of the antenna ports used to send the uplink data is $p_0=(1/M) \times p_p$. Therefore, the network device can determine, from the two subsets, a precoding matrix used to send the to-be-sent uplink data, in other words, can flexibly determine the actual transmit power for the to-be-sent uplink data, thereby improving data transmission reliability.

The foregoing describes in detail the data transmission methods provided in the embodiments of this application with reference to FIG. 1 to FIG. 4. The following describes data transmission apparatuses provided in the embodiments of this application with reference to FIG. 5 to FIG. 8. Technical features described in the method embodiments are also applicable to the following apparatus embodiments.

Figure 5:
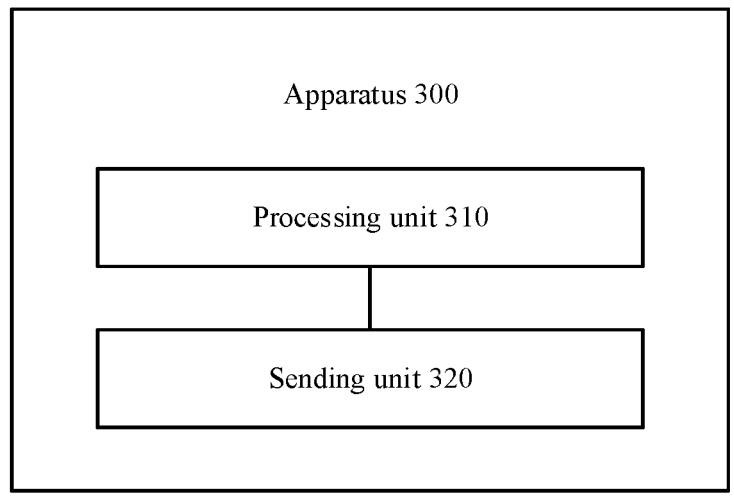
FIG. 5 to FIG. 8 are schematic block diagrams of data transmission apparatuses according to embodiments of this application.

FIG. 5 is a schematic block diagram of a data transmission apparatus 300 according to an embodiment of this application. As shown in FIG. 5, the apparatus 300 includes a processing unit 310 and a sending unit 320.

The processing unit 310 is configured to determine a channel transmit power for first uplink data.

The processing unit 310 is further configured to determine an actual transmit power for the first uplink data based on the channel transmit power and a transmission parameter, where the actual transmit power is less than or equal to the channel transmit power, and the transmission parameter includes one or more of the following:
a power headroom, where the power headroom indicates a difference between a maximum transmit power allowed by the apparatus and the channel transmit power, and the channel transmit power is less than or equal to the maximum transmit power allowed by the apparatus; or
a waveform used to send the first uplink data; or
a downlink control information DCI format used to schedule the first uplink data; or
a modulation and coding scheme MCS used to send the first uplink data; or
a power adjustment value used to send the first uplink data.

The sending unit 320 is configured to send the first uplink data at the actual transmit power.

In a possible implementation, N is less than M, M is a quantity of antenna ports configured by a network device to send the first uplink data, N is a quantity of non-zero power antenna ports that are in the M antenna ports and that are used to send the first uplink data, N is an integer greater than or equal to 1, and M is an integer greater than 1.

In a possible implementation, the transmission parameter includes the power headroom.

If the power headroom satisfies a first condition, the actual transmit power is $p_t > (N/M) \times p_p$, where $p_p$ is the channel transmit power.

Therefore, according to the data transmission apparatus provided in this embodiment of this application, when the power headroom that can indicate a location of the terminal device satisfies the first condition, the actual transmit power is increased, so that the terminal device located at a cell edge can send the uplink data at a relatively high transmit power, thereby improving data transmission reliability.

In a possible implementation, the first condition is that the power headroom is greater than or equal to a first threshold.
When N=1 and M=4, the first threshold is equal to 6 dBm; or
when N=2 and M=4, the first threshold is equal to 3 dBm; or
when N=1 and M=2, the first threshold is equal to 3 dBm.

In a possible implementation, the transmission parameter includes the waveform used to send the first uplink data.

If the waveform is a discrete Fourier transform spread orthogonal frequency division multiplexing DFT-s-OFDM waveform, the actual transmit power is $p_t > (N/M) \times p_p$, where $p_p$ is the channel transmit power.

In a possible implementation, the transmission parameter includes the downlink control information DCI format used to send the first uplink data.

If the DCI format is a first DCI format, the actual transmit power is $p_t = (N/M) \times p_p$, where the first DCI format is a DCI format including a smallest quantity of bits in a plurality of DCI formats used to schedule the uplink data, and $p_p$ is the channel transmit power.

In a possible implementation, the transmission parameter includes the modulation and coding scheme MCS used to send the first uplink data.

If a modulation scheme of the MCS is binary phase shift keying BPSK or quadrature phase shift keying QPSK, the actual transmit power is $p_p > (N/M) \times p_p$, where $p_p$ is the channel transmit power.

In a possible implementation, the transmission parameter includes the power adjustment value used to send the first uplink data.

If power adjustment values obtained by the processing unit for K times each satisfy a second condition, the actual transmit power is $p_t > (N/M) \times p_p$, where $p_p$ is the channel transmit power, and K is an integer greater than or equal to 1.

In a possible implementation, the second condition is that the power adjustment values obtained by the processing unit for K times each are greater than or equal to a second threshold, and the second threshold is equal to 3 dBm.

In a possible implementation, the second condition is specifically that power adjustment values obtained by the processing unit for K consecutive times each are equal to the second threshold, and K is an integer greater than 1.

In a possible implementation, the actual transmit power is equal to the channel transmit power.

In a possible implementation, when N=1, a transmit power on the one antenna port is $p_0 = p_p$; or
when N=2, a transmit power on one of the two antenna ports is $p_0 = 0.5 p_p$.

In a possible implementation, the processing unit 310 is further configured to: evenly allocate the actual transmit power to the N antenna ports used to send the first uplink data.

Therefore, according to the data transmission apparatus provided in this embodiment of this application, the apparatus determines the actual transmit power for the uplink data based on the channel transmit power and various transmission parameters that can indicate whether the terminal device is located at the cell edge, so that the actual transmit power for the uplink data can be flexibly adjusted, thereby improving data transmission reliability.

The data transmission apparatus 300 may correspond to the terminal device described in the method 100 (for example, may be configured as the terminal device or may be the terminal device), and modules or units in the data transmission apparatus 300 are separately configured to perform actions or processing processes performed by the terminal device in the method 100. To avoid repetition, details are not described herein again.

In this embodiment of this application, the apparatus 300 may be a terminal device. In this case, the apparatus 300 may include a processor, a transmitter, and a receiver. The processor, the transmitter, and the receiver are communicatively connected to each other. Optionally, the apparatus further includes a memory. The memory is communicatively connected to the processor. Optionally, the processor, the memory, the transmitter, and the receiver may be in a communication connection. The memory may be configured to store an instruction. The processor is configured to execute the instruction stored in the memory, to control the transmitter to send information or control the receiver to receive a signal.

In this case, the processing unit 310 in the apparatus 300 shown in FIG. 5 may correspond to the processor, and the sending unit 320 in the apparatus 300 shown in FIG. 5 may correspond to the transmitter. In another implementation, the transmitter and the receiver may be implemented by one component, that is, a transceiver.

In this embodiment of this application, the apparatus 300 may be a chip (or a chip system) installed in the terminal device. In this case, the apparatus 300 may include a processor and an input/output interface. The processor may be communicatively connected to a transceiver of the terminal device through the input/output interface. Optionally, the apparatus further includes a memory. The memory is communicatively connected to the processor. Optionally, the processor, the memory, and the transceiver may be in a communication connection. The memory may be configured to store an instruction. The processor is configured to execute the instruction stored in the memory, to control the transceiver to send information or a signal.

In this case, the processing unit 310 in the apparatus 300 shown in FIG. 5 may correspond to the processor, and the sending unit 320 in the apparatus 300 shown in FIG. 5 may correspond to the output interface.

Figure 6:
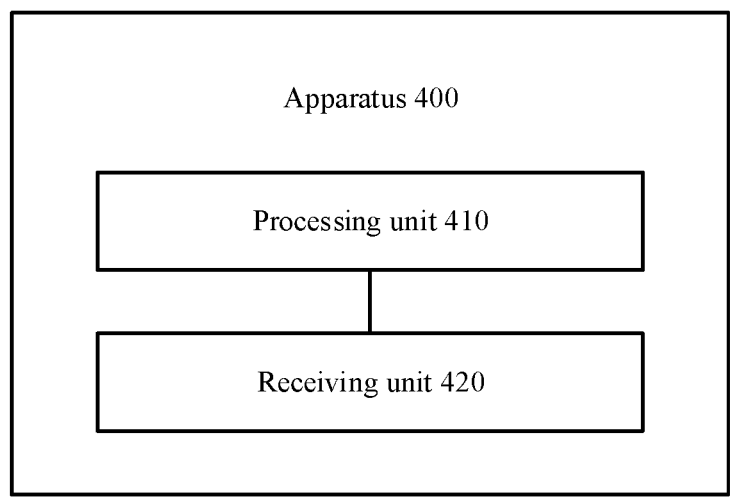

FIG. 6 is a schematic block diagram of a data transmission apparatus 400 according to an embodiment of this application. As shown in FIG. 6, the apparatus 400 includes a processing unit 410 and a receiving unit 420.

The processing unit 410 is configured to determine a channel transmit power for first uplink data.

The processing unit 410 is further configured to determine an actual transmit power for the first uplink data based on the channel transmit power and a transmission parameter, where the actual transmit power is less than or equal to the channel transmit power, and the transmission parameter includes one or more of the following:

a power headroom, where the power headroom indicates a difference between a maximum transmit power allowed by a terminal device and the channel transmit power, and the channel transmit power is less than or equal to the maximum transmit power allowed by the terminal device; or
a waveform used to send the first uplink data; or
a downlink control information DCI format used to schedule the first uplink data; or
a modulation and coding scheme MCS used to send the first uplink data; or
a power adjustment value used to send the first uplink data.

The receiving unit 420 is configured to receive the first uplink data.

In a possible implementation, N is less than M, M is a quantity of antenna ports configured by the network device to send the first uplink data, N is a quantity of non-zero power antenna ports that are in the M antenna ports and that are used to send the first uplink data, N is an integer greater than or equal to 1, and M is an integer greater than 1.

In a possible implementation, the transmission parameter includes the power headroom.

If the power headroom satisfies a first condition, the actual transmit power is $p_t > (N/M) \times p_p$, where $p_p$ is the channel transmit power.

The first condition is used to determine that the terminal device is located at a cell edge.

In a possible implementation, if the power headroom does not satisfy a first condition, the actual transmit power is $p_t = (N/M) \times p_p$.

In a possible implementation, the first condition is that the power headroom is greater than or equal to a first threshold.

When N=1 and M=4, the first threshold is equal to 6 dBm; or
when N=2 and M=4, the first threshold is equal to 3 dBm; or
when N=1 and M=2, the first threshold is equal to 3 dBm.

In a possible implementation, the transmission parameter includes the waveform used to send the first uplink data.

If the waveform is a discrete Fourier transform spread orthogonal frequency division multiplexing DFT-s-OFDM waveform, the actual transmit power is $p_p > (N/M) \times p_p$, where $p_p$ is the channel transmit power.

In a possible implementation, if the waveform is a CP-OFDM waveform, the actual transmit power is $p_t = (N/M) \times p_p$.

In a possible implementation, the transmission parameter includes the downlink control information DCI format used to send the first uplink data.

If the DCI format is a first DCI format, the actual transmit power is $p_t > (N/M) \times p_p$, where the first DCI format is a DCI format including a smallest quantity of bits in a plurality of DCI formats used to schedule the uplink data, and $p_p$ is the channel transmit power.

In a possible implementation, if the DCI format is a second DCI format, the actual transmit power is $p_t = (N/M) \times p_p$, where the second DCI format is a DCI format other than the first DCI format in a plurality of DCI formats used to schedule the uplink data.

In a possible implementation, the transmission parameter includes the modulation and coding scheme MCS used to send the first uplink data.

If a modulation scheme of the MCS is binary phase shift keying BPSK or quadrature phase shift keying QPSK, the actual transmit power is $p_t > (N/M) \times p_p$, where $p_p$ is the channel transmit power.

In a possible implementation, if a modulation scheme of the MCS is 16 quadrature amplitude modulation QAM, the actual transmit power is $p_t = (N/M) \times p_p$.

In a possible implementation, the transmission parameter includes the power adjustment value used to send the first uplink data.

If power adjustment values obtained by the terminal device for K times each satisfy a second condition, the actual transmit power is $p_t > (N/M) \times p_p$, where $p_p$ is the channel transmit power, and K is an integer greater than or equal to 1.

The second condition is used to determine that the terminal device is located at the cell edge.

In a possible implementation, if power adjustment values obtained by the terminal device for K times each do not satisfy a second condition, the actual transmit power is $p_t = (N/M) \times p_p$.

In a possible implementation, the second condition is that the power adjustment values obtained by the terminal device for K times each are greater than or equal to a second threshold, and the second threshold is equal to 3 dBm.

In a possible implementation, the second condition is specifically that power adjustment values obtained by the terminal device for K consecutive times each are equal to the second threshold, and K is an integer greater than 1.

In a possible implementation, the actual transmit power is equal to the channel transmit power.

In a possible implementation, when N=1, a transmit power on the one antenna port is $p_0=p_p$; or when N=2, a transmit power on one of the two antenna ports is $p_0=0.5p_p$.

Therefore, according to the data transmission apparatus provided in this embodiment of this application, when the actual quantity N of antenna ports used to send the uplink data is less than the quantity M of antenna ports configured by the network device to send the uplink data, the actual transmit power for the uplink data may be determined based on the channel transmit power and various transmission parameters that can indicate whether the terminal device is located at the cell edge, so that the actual transmit power for the uplink data is flexibly adjusted, thereby improving data transmission reliability. In addition, this facilitates scheduling by the apparatus and system optimization.

The data transmission apparatus 400 may correspond to the network device described in the method 100 (for example, may be configured as the network device or may be the network device), and modules or units in the data transmission apparatus 400 are separately configured to perform actions or processing processes performed by the network device in the method 100. To avoid repetition, details are not described herein again.

In this embodiment of this application, the apparatus 400 may be a network device. In this case, the apparatus 400 may include a processor, a transmitter, and a receiver. The processor, the transmitter, and the receiver are communicatively connected to each other. Optionally, the apparatus further includes a memory. The memory is communicatively connected to the processor. Optionally, the processor, the memory, the transmitter, and the receiver may be communicatively connected to each other. The memory may be configured to store an instruction. The processor is configured to execute the instruction stored in the memory, to control the transmitter to send information or control the receiver to receive a signal.

In this case, the processing unit 410 in the apparatus 400 shown in FIG. 6 may correspond to the processor, and the receiving unit 420 in the apparatus 400 shown in FIG. 6 may correspond to the receiver. In this embodiment of this application, the apparatus 400 may be a chip (or a chip system) installed in the network device. In this case, the apparatus 400 may include a processor and an input/output interface. The processor may be communicatively connected to a transceiver of the network device through the input/output interface. Optionally, the apparatus further includes a memory. The memory is communicatively connected to the processor. Optionally, the processor, the memory, and the transceiver may be communicatively connected to each other. The memory may be configured to store an instruction. The processor is configured to execute the instruction stored in the memory, to control the transceiver to send information or a signal.

In this case, the processing unit 410 in the apparatus 400 shown in FIG. 6 may correspond to the processor, and the receiving unit 420 in the apparatus 400 shown in FIG. 6 may correspond to the input interface.

Figure 7:
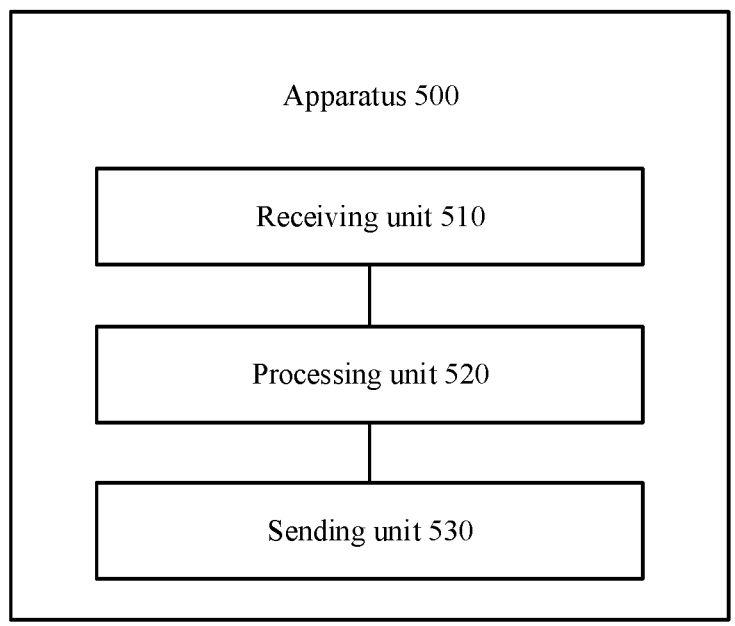

FIG. 7 is a schematic block diagram of a data transmission apparatus 500 according to an embodiment of this application. As shown in FIG. 7, the apparatus 500 includes a receiving unit 510, a processing unit 520, and a sending unit 530.

The receiving unit 510 is configured to receive indication information, where the indication information is used to indicate a first precoding matrix used to send first uplink data, and the first precoding matrix belongs to a first precoding matrix subset or a second precoding matrix subset of a precoding matrix set.

A transmit power for uplink data that is determined based on each of one or more precoding matrices in the first precoding matrix subset satisfies the following condition: a transmit power on one of antenna ports used to send the uplink data is $p_0>(1/M)\times p_p$, where a quantity of antenna ports used to send the uplink data is greater than or equal to 1 and less than M; and a transmit power for uplink data that is determined based on each of one or more precoding matrices in the second precoding matrix subset satisfies the following condition: a transmit power on one of the antenna ports used to send the uplink data is $p_0=(1/M)\times p_p$.

Herein, M is a quantity of antenna ports configured by a network device to send the first uplink data, M is an integer greater than 1, and $p_p$ is a channel transmit power for the uplink data.

The processing unit 520 is configured to determine an actual transmit power for the first uplink data based on the first precoding matrix and the channel transmit power for the first uplink data, where the actual transmit power is less than or equal to the channel transmit power for the first uplink data.

The sending unit 530 is configured to send the first uplink data at the actual transmit power.

In a possible implementation, the transmit power determined based on each of the one or more precoding matrices in the first precoding matrix subset specifically satisfies the following condition:

When the quantity of antenna ports used to send the uplink data is equal to 1, a transmit power on the one antenna port is $p_0=p_p$; or when the quantity of antenna ports used to send the uplink data is equal to 2, a transmit power on one of the two antenna ports is $p_0=0.5p_p$.

In a possible implementation, each precoding matrix in the precoding matrix set includes a phase and an amplitude quantized value, and the amplitude quantized value is used to determine the transmit power for the uplink data.

A phase of each of the one or more precoding matrices in the first precoding matrix subset is a phase of a precoding matrix included in the second precoding matrix subset.

Therefore, according to the data transmission apparatus in this embodiment of this application, the first precoding subset and the second precoding subset are set in the precoding set; a transmit power for uplink data that is determined based on any precoding matrix in the first precoding matrix subset satisfies the following condition: a transmit power on one of the antenna ports used to send the uplink data is $p_0>(1/M)\times p_p$, where the quantity of antenna ports used to send the uplink data is greater than or equal to 1 and less than M; and a transmit power for uplink data that is determined based on any precoding matrix in the second precoding matrix subset satisfies the following condition: a transmit power on one of the antenna ports used to send the uplink data is $p_0=(1/M)\times p_p$. Therefore, the network device can dynamically indicate, from the two precoding matrix subsets, a precoding matrix used to send the to-be-sent uplink data, in other words, can flexibly determine the actual transmit power for the to-be-sent uplink data, thereby improving data transmission reliability.

The data transmission apparatus 500 may correspond to the terminal device described in the foregoing method 200

(for example, may be configured as the terminal device or may be the terminal device), and modules or units in the data transmission apparatus 500 are separately configured to perform actions or processing processes performed by the terminal device in the method 200. To avoid repetition, details are not described herein again.

In this embodiment of this application, the apparatus 500 may be a terminal device. In this case, the apparatus 500 may include a processor, a transmitter, and a receiver. The processor, the transmitter, and the receiver are communicatively connected to each other. Optionally, the apparatus further includes a memory. The memory is communicatively connected to the processor. Optionally, the processor, the memory, the transmitter, and the receiver may be communicatively connected to each other. The memory may be configured to store an instruction. The processor is configured to execute the instruction stored in the memory, to control the transmitter to send information or control the receiver to receive a signal.

In this case, the receiving unit 510 in the apparatus 500 shown in FIG. 7 may correspond to the receiver, the processing unit 520 in the apparatus 500 shown in FIG. 7 may correspond to the processor, and the sending unit 530 in the apparatus 500 shown in FIG. 7 may correspond to the transmitter. In another implementation, the transmitter and the receiver may be implemented by one component, that is, a transceiver.

In this embodiment of this application, the apparatus 500 may be a chip (or a chip system) installed in the terminal device. In this case, the apparatus 500 may include a processor and an input/output interface. The processor may be communicatively connected to a transceiver of the terminal device through the input/output interface. Optionally, the apparatus further includes a memory. The memory is communicatively connected to the processor. Optionally, the processor, the memory, and the transceiver may be communicatively connected to each other. The memory may be configured to store an instruction. The processor is configured to execute the instruction stored in the memory, to control the transceiver to send information or a signal.

In this case, the receiving unit 510 in the apparatus 500 shown in FIG. 7 may correspond to the input interface, the processing unit 520 in the apparatus 500 shown in FIG. 7 may correspond to the processor, and the sending unit 530 in the apparatus 500 shown in FIG. 7 may correspond to the output interface.

Figure 8:
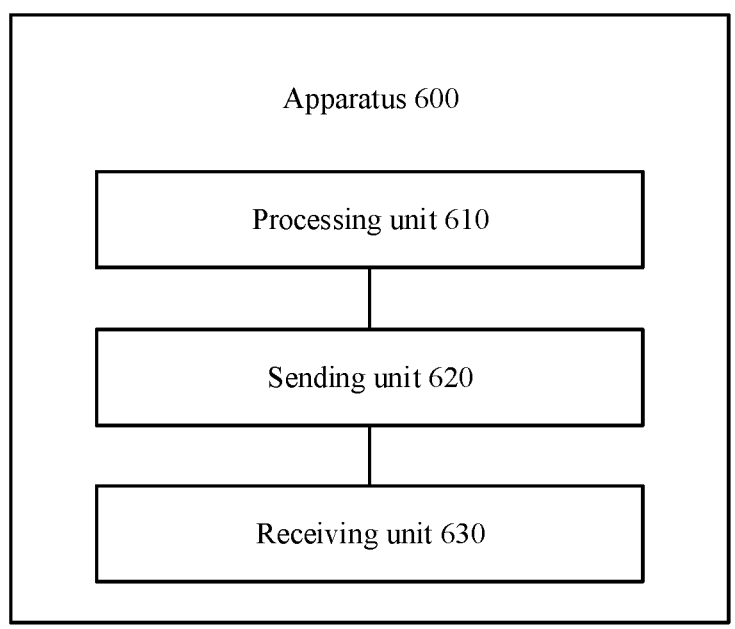

FIG. 8 is a schematic block diagram of a data transmission apparatus 600 according to an embodiment of this application. As shown in FIG. 8, the apparatus 600 includes a processing unit 610, a sending unit 620, and a receiving unit 630.

The processing unit 610 is configured to determine a first precoding matrix used to precode first uplink data, where the first precoding matrix belongs to a first precoding matrix subset or a second precoding matrix subset of a precoding matrix set.

A transmit power for uplink data that is determined based on each of one or more precoding matrices in the first precoding matrix subset satisfies the following condition: a transmit power on one of antenna ports used to send the uplink data is $p_0 > (1/M) \times p_p$, where a quantity of antenna ports used to send the uplink data is greater than or equal to 1 and less than M; and a transmit power for uplink data that is determined based on each of one or more precoding matrices in the second precoding matrix subset satisfies the following condition: a transmit power on one of the antenna ports used to send the uplink data is $p_0 = (1/M) \times p_p$.

Herein, M is a quantity of antenna ports configured by the network device to send the first uplink data, M is an integer greater than 1, and $p_p$ is a channel transmit power for the uplink data.

The sending unit 620 is configured to send indication information used to indicate the first precoding matrix.

The receiving unit 630 is configured to receive the first uplink data.

In a possible implementation, the transmit power determined based on each of the one or more precoding matrices in the first precoding matrix subset specifically satisfies the following condition:
When the quantity of antenna ports used to send the uplink data is equal to 1, a transmit power on the one antenna port is $p_0 = p_p$; or
when the quantity of antenna ports used to send the uplink data is equal to 2, a transmit power on one of the two antenna ports is $p_0 = 0.5 p_p$.

In a possible implementation, each precoding matrix in the precoding matrix set includes a phase and an amplitude quantized value, and the amplitude quantized value is used to determine the transmit power for the uplink data.

A phase of each of the one or more precoding matrices in the first precoding matrix subset is a phase of a precoding matrix included in the second precoding matrix subset.

Therefore, according to the data transmission apparatus in this embodiment of this application, the first precoding subset and the second precoding subset are set in the precoding set; a transmit power for uplink data that is determined based on any precoding matrix in the first precoding matrix subset satisfies the following condition: a transmit power on one of the antenna ports used to send the uplink data is $p_0 = (1/M) \times p_p$, where the quantity of antenna ports used to send the uplink data is greater than or equal to 1 and less than M; and a transmit power for uplink data that is determined based on any precoding matrix in the second precoding matrix subset satisfies the following condition: a transmit power on one of the antenna ports used to send the uplink data is $p_0 = (1/M) \times p_p$. Therefore, the apparatus can dynamically indicate, from the two precoding matrix subsets, a precoding matrix used to send the to-be-sent uplink data, in other words, can flexibly determine the actual transmit power for the to-be-sent uplink data, thereby improving data transmission reliability.

The data transmission apparatus 600 may correspond to the network device described in the method 200 (for example, may be configured as the network device or may be the network device), and modules or units in the data transmission apparatus 600 are separately configured to perform actions or processing processes performed by the network device in the method 200. To avoid repetition, details are not described herein again.

In this embodiment of this application, the apparatus 600 may be a network device. In this case, the apparatus 600 may include a processor, a transmitter, and a receiver. The processor, the transmitter, and the receiver are communicatively connected to each other. Optionally, the apparatus further includes a memory. The memory is communicatively connected to the processor. Optionally, the processor, the memory, the transmitter, and the receiver may be communicatively connected to each other. The memory may be configured to store an instruction. The processor is configured to execute the instruction stored in the memory, to control the transmitter to send information or control the receiver to receive a signal.

In this case, the processing unit 610 in the apparatus 600 shown in FIG. 8 may correspond to the processor, the sending unit 620 in the apparatus 600 shown in FIG. 8 may correspond to the transmitter, and the receiving unit 630 in the apparatus 600 shown in FIG. 8 may correspond to the receiver. In another implementation, the transmitter and the receiver may be implemented by one component, that is, a transceiver.

In this embodiment of this application, the apparatus 600 may be a chip (or a chip system) installed in the network device. In this case, the apparatus 600 may include a processor and an input/output interface. The processor may be communicatively connected to a transceiver of the network device through the input/output interface. Optionally, the apparatus further includes a memory. The memory is communicatively connected to the processor. Optionally, the processor, the memory, and the transceiver may be communicatively connected to each other. The memory may be configured to store an instruction. The processor is configured to execute the instruction stored in the memory, to control the transceiver to send information or a signal.

In this case, the processing unit in the apparatus 600 shown in FIG. 8 may correspond to the processor, the sending unit 620 in the apparatus 600 shown in FIG. 8 may correspond to the output interface, and the receiving unit 630 in the apparatus 600 shown in FIG. 8 may correspond to the input interface.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or in another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for data transmission, wherein the method comprises:
    determining, by a terminal device, a channel transmit power for first uplink data;
    determining, by the terminal device, an actual transmit power for the first uplink data based on the channel transmit power and a transmission parameter, wherein the actual transmit power is less than or equal to the channel transmit power, wherein the actual transmit power is $P_j > (N/M) \times p_p$ when the transmission parameter satisfies a first condition, wherein $P_p$ is the channel transmit power, N is less than M, M is a quantity of antenna ports configured by a network device to send the first uplink data, N is a quantity of non-zero power antenna ports that are in the M antenna ports and that are used to send the first s uplink data, N is an integer greater than or equal to 1, and M is an integer greater than 1, and wherein the transmission parameter comprises one of the following:
        a power headroom, wherein the power headroom indicates a difference between a maximum transmit power allowed by the terminal device and the channel transmit power, and wherein the channel transmit power is less than or equal to the maximum transmit power allowed by the terminal device;
        a waveform used to send the first uplink data;
        a downlink control information (DCI) format used to schedule the first uplink data;
        a modulation and coding scheme (MCS) used to send the first uplink data; or
        a power adjustment value used to send the first uplink data; and
    sending, by the terminal device, the first uplink data at the actual transmit power.

2. The method according to claim 1, wherein:
when the transmission parameter comprises the power headroom, the first condition is that the power headroom is greater than or equal to a first threshold, wherein:
when N=1 and M=4, the first threshold is equal to 6 dBm; or
when N=2 and M:=4, the first threshold is equal to 3 dBm; or
when N=1 and M=2, the first threshold is equal to 3 dBm.

3. The method according to claim 1, wherein:
when the transmission parameter comprises the waveform used to send the first uplink data,
the first condition is that the waveform is a discrete Fourier transform spread orthogonal frequency division multiplexing (DFT-s-OFDM) waveform.

4. The method according to claim 1, wherein:
when the transmission parameter comprises the downlink control information (DCI) format used to send the first uplink data,
the first condition is that the DCII format is a first DCI format comprising a smallest quantity of bits in a plurality of DCI formats used to schedule the uplink data.

5. The method according to claim 1, wherein:
when the transmission parameter comprises the modulation and coding scheme (MCS) used to send the first uplink data,
the first condition is that a modulation scheme of the MCS is binary phase shift keying (BPSK) or quadrature phase shift keying (QPSK).

6. The method according to claim 1, wherein:
when the transmission parameter comprises the power adjustment value used to send the first uplink data,
the first condition is that power adjustment values obtained by the terminal device for K times each satisfy a second condition, wherein K is an integer greater than or equal to 1.

7. The method according to claim 1, wherein the second condition is that the power adjustment values obtained by the terminal device for K times each are greater than or equal to a second threshold, and wherein the second threshold is equal to 3 dBm.

8. An apparatus for data transmission, wherein the apparatus comprises:
at least one processor;
one or more memories; and
a transmitter, wherein:
the one or more memories are coupled to the at least one processor and store instructions for execution by the at least one processor to:
determine a channel transmit power for first uplink data;
determine an actual transmit power for the first uplink data based on the channel transmit power and a transmission parameter, wherein the actual transmit power is less than or equal to the channel transmit power, wherein the actual transmit power is $P_p > (N/M) \times P_p$ when the transmission parameter satisfies a first condition, wherein $P_p$ is the channel transmit power, N is less than M, M is a quantity of antenna ports configured by a network device to send the first uplink data N is a quantity of non-zero power antenna ports that are in the M antenna ports and that are used to send the first uplink data, N is an integer greater than or equal to 1, and M is an integer greater than 1, and wherein the transmission parameter comprises one of the following:
a power headroom, wherein the power headroom indicates a difference between a maximum transmit power allowed by the apparatus and the channel transmit power, and wherein the channel transmit power is less than or equal to the maximum transmit power allowed by the apparatus;
a waveform used to send the first uplink data;
a downlink control information (DCI) format used to schedule the first uplink data;
a modulation and coding scheme (MCS) used to send the first uplink data; or
a power adjustment value used to send the first uplink data; and
instruct the transmitter to send the first uplink data at the actual transmit power.

9. The apparatus according to claim 8, wherein:
when the transmission parameter comprises the power headroom, the first condition is that the power headroom is greater than or equal to a first threshold, wherein:
when N=1 and M=4, the first threshold is equal to 6 dBm; or
when N:=2 and M=4, the first threshold is equal to 3 dBm; or
when N=1 and M=2, the first threshold is equal to 3 dBm.

10. The apparatus according to claim 8, wherein:
when the transmission parameter comprises the waveform used to send the first uplink data,
the first condition is that the waveform is a discrete Fourier transform spread orthogonal frequency division multiplexing (DFT-s-OFDM) waveform.

11. The apparatus according to claim 8, wherein:
when the transmission parameter comprises the downlink control information (DCI) format used to send the first uplink data,
the first condition is that the DCI format is a first DCI format comprising a smallest quantity of bits in a plurality of DCI formats used to schedule the uplink data.

12. The apparatus according to claim 8, wherein:
when the transmission parameter comprises the modulation and coding scheme (MCS) used to send the first uplink data,
the first condition is that a modulation scheme of the MCS is binary phase shift keying (BPSK) or quadrature phase shift keying (QPSK).

13. The apparatus according to claim 8, wherein:
when the transmission parameter comprises the power adjustment value used to send the first uplink data,
the first condition is that power adjustment values obtained by the processor for K times each satisfy a second condition, wherein K is an integer greater than or equal to 1.

14. The apparatus according to claim 13, wherein the second condition is that the power adjustment values obtained by the processor for K times each are greater than or equal to a second threshold, and wherein the second threshold is equal to 3 dBm.

15. An apparatus for data transmission, wherein the apparatus comprises:
at least one processor;
one or more memories; and a receiver, wherein:

the one or more memories are coupled to the at least one processor and store instructions for execution by the at least one processor to:

determine a channel transmit power for first uplink data;

determine an actual transmit power for the first uplink data based on the channel transmit power and a transmission parameter, wherein the actual transmit power is less than or equal to the channel transmit power, wherein the actual transmit power is $P_f > (N/M) \times P_p$ when the transmission parameter satisfies a first condition wherein P is the channel transmit power, N is less than M, M is a quantity of antenna ports configured by a network device to send the first uplink data N is a quantity of non-zero power antenna ports that are in the M antenna ports and that are used to send the first uplink data, N is an integer greater than or equal to 1, and M is an integer greater than 1, and wherein the transmission parameter comprises one of the following:

a power headroom, wherein the power headroom indicates a difference between a maximum transmit power allowed by a terminal device and the channel transmit power, and wherein the channel transmit power is less than or equal to the maximum transmit power allowed by the terminal device;

a waveform used to send the first uplink data;

a downlink control information (DCI) format used to schedule the first uplink data;

a modulation and coding scheme (MCS) used to send the first uplink data; or a power adjustment value used to send the first uplink data; and instruct the receiver to receive the first uplink data.

16. A method for data transmission, wherein the method comprises:

determining, by a network device, a channel transmit power for first uplink data;

determining, by the network device, an actual transmit power for the first uplink data based on the channel transmit power and a transmission parameter, wherein the actual transmit power is less than or equal to the channel transmit power, wherein the actual transmit power is $P_f > (N/M) \times P_p$ when the transmission parameter satisfies a first condition, wherein $P_p$ is the channel transmit power, N is less than M, M is a quantity of antenna ports configured by a network device to send the first uplink data, N is a quantity of non-zero power antenna ports that are in the M antenna ports and that are used to send the first uplink data, N is an integer greater than or equal to 1, and M is an integer greater than 1, and the transmission parameter comprises one of the following:

a power headroom, wherein the power headroom indicates a difference between a maximum transmit power allowed by a terminal device and the channel transmit power, and the channel transmit power is less than or equal to the maximum transmit power allowed by the terminal device;

a waveform used to send the first uplink data;

a downlink control information (DCI) format used to schedule the first uplink data;

a modulation and coding scheme (MCS) used to send the first uplink data; or a power adjustment value used to send the first uplink data; and receiving, by the network device, the first uplink data.

17. An apparatus for data transmission, wherein the apparatus comprises:

at least one processor;

one or more memories; and a receiver, wherein:

the one or more memories store programming instructions for execution by the at least one processor to:

determine a channel transmit power for first uplink data;

determine an actual transmit power for the first uplink data based on the channel transmit power and a transmission parameter, wherein the actual transmit power is less than or equal to the channel transmit power, wherein the actual transmit power is $P_f > (N/M) \times P_p$ when the transmission parameter satisfies a first condition, wherein $P_p$ is the channel transmit power, N is less than M, M is a quantity of antenna ports configured by a network device to send the first uplink data, N is a quantity of non-zero power antenna ports that are in the M antenna ports and that are used to send the first uplink data, N is an integer greater than or equal to 1, and M is an integer greater than 1, and the transmission parameter comprises one of the following:

a power headroom, wherein the power headroom indicates a difference between a maximum transmit power allowed by a terminal device and the channel transmit power, and the channel transmit power is less than or equal to the maximum transmit power allowed by the terminal device;

a waveform used to send the first uplink data;

a downlink control information DCI format used to schedule the first uplink data;

a modulation and coding scheme MCS used to send the first uplink data; or a power adjustment value used to send the first uplink data; and instruct the receiver to receive the first uplink data.

* * * * *

UNITED STATES PATENT AND TRADEMARK OFFICE
CERTIFICATE OF CORRECTION

PATENT NO. : 12,137,420 B2
APPLICATION NO. : 17/214347
DATED : November 5, 2024
INVENTOR(S) : Xianda Liu, Liuliu Ji and Kunpeng Liu It is certified that error appears in the above-identified patent and that said Letters Patent is hereby corrected as shown below:

On the Title Page

In Column 2 (Item (57) Abstract), In Line 1-2, Delete "Example data transmission methods and apparatus are described. One example method includes determining" and insert -- A terminal device determines --.

In Column 2 (Item (57) Abstract), In Line 3-4, After "data" delete "by a terminal device".

In Column 2 (Item (57) Abstract), In Line 7, After "parameter" delete "includes one or more of parameters that".

In Column 2 (Item (57) Abstract), In Line 10-15, After "power." delete "Therefore, the terminal device may determine the actual transmit power for the uplink data based on the channel transmit power and various transmission parameters that can indicate whether the terminal device is located at a cell edge, so that the actual transmit power for the uplink data can be flexibly adjusted.".

In the Claims

In Column 64, In Line 42, In Claim 1, delete "$\times p_p$" and insert -- $\times P_p$ --.

In Column 64, In Line 48 (Approx.), In Claim 1, delete "first s" and insert -- first --.

In Column 65, In Line 8 (Approx.), In Claim 2, delete "M:=4," and insert -- M=4, --.

In Column 65, In Line 22, In Claim 4, delete "DCII" and insert -- DCI --.

In Column 65, In Line 40, In Claim 7, delete "claim 1," and insert -- claim 6, --.

In Column 65, In Line 64, In Claim 8, delete "data" and insert -- data, --.

Signed and Sealed this
Thirteenth Day of May, 2025

Coke Morgan Stewart
*Acting Director of the United States Patent and Trademark Office*

In Column 66, In Line 26, In Claim 9, delete "N:=2" and insert -- N=2 --.

In Column 67, In Line 13 (Approx.), In Claim 15, delete "condition" and insert -- condition, --.

In Column 67, In Line 13 (Approx.), In Claim 15, delete "P" and insert -- $P_p$ --.

In Column 67, In Line 16 (Approx.), In Claim 15, delete "data" and insert -- data, --.